US012731438B2

(12) United States Patent
Yakishyn

(10) Patent No.: US 12,731,438 B2
(45) Date of Patent: Sep. 8, 2026

(54) METHOD AND ELECTRONIC DEVICE FOR DETERMINING USER'S HAND IN VIDEO

(71) Applicant: Samsung Electronics Co., Ltd., Suwon-si (KR)

(72) Inventor: Yevhenii Yakishyn, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 18/457,636

(22) Filed: Aug. 29, 2023

(65) Prior Publication Data

US 2023/0410562 A1 Dec. 21, 2023

Related U.S. Application Data

(63) Continuation of application No. PCT/KR2023/000806, filed on Jan. 17, 2023.

(30) Foreign Application Priority Data

Jan. 25, 2022 (KR) ........................ 10-2022-0011065
Aug. 29, 2022 (KR) ........................ 10-2022-0108652

(51) Int. Cl.
*G06F 3/01* (2006.01)
*G06T 7/194* (2017.01)
(Continued)

(52) U.S. Cl.
CPC .............. *G06V 40/28* (2022.01); *G06F 3/012* (2013.01); *G06F 3/017* (2013.01); *G06T 7/194* (2017.01);
(Continued)

(58) Field of Classification Search
CPC ............................................ G06T 2207/30196
See application file for complete search history.

(56) References Cited

U.S. PATENT DOCUMENTS 9,207,771 B2 12/2015 Antoniac
10,007,329 B1 6/2018 Holz
(Continued)

FOREIGN PATENT DOCUMENTS

CN 111145308 A * 5/2020 ............. G06V 20/20
EP 3188075 A1 * 7/2017 ............. G06F 3/147
(Continued)

OTHER PUBLICATIONS

International Search Report dated May 1, 2023, issued in International Patent Application No. PCT/KR2023/000806.
(Continued)

*Primary Examiner* — Di Xiao
(74) *Attorney, Agent, or Firm* — Jefferson IP Law, LLP

(57) ABSTRACT

A method is provided. The method includes obtaining a video including a plurality of frames, estimating a field of view (FoV) trajectory indicating movements of a FoV of the camera, by using the frames of the video, detecting feature points of one or more objects in each of the frames of the video, estimating object trajectories indicating movements of the one or more objects, based on the feature points, determining hand candidates of a user from among the one or more objects, based on the FoV trajectory of the camera and the object trajectories, obtaining a head movement trajectory indicating movements of a head of the user, determining a hand of the user, based on the head movement trajectory and the object trajectories corresponding to the hand candidates of the user, tracking the determined hand of the user in the video, and recognizing a gesture.

20 Claims, 20 Drawing Sheets

(51) Int. Cl.
*G06T 7/246* (2017.01)
*G06V 40/20* (2022.01)

(52) U.S. Cl.
CPC .... *G06T 7/246* (2017.01); *G06T 2207/10016* (2013.01); *G06T 2207/30201* (2013.01); *G06T 2207/30241* (2013.01); *G06T 2207/30244* (2013.01)

(56) References Cited

U.S. PATENT DOCUMENTS

| | | | |
|---|---|---|---|
| 10,657,367 | B2 | 5/2020 | Fei et al. |
| 10,798,292 | B1 | 10/2020 | Lei et al. |
| 10,976,807 | B2 | 4/2021 | De Nardi et al. |
| 2012/0249741 | A1 | 10/2012 | Maciocci et al. |
| 2013/0301926 | A1 | 11/2013 | Eilat et al. |
| 2016/0026257 | A1 | 1/2016 | Wexler et al. |
| 2017/0185830 | A1 | 6/2017 | Srivastava |
| 2019/0391724 | A1 | 12/2019 | Holz et al. |
| 2020/0174552 | A1* | 6/2020 | Stafford .................. A63F 13/42 |
| 2022/0004750 | A1 | 1/2022 | Koo et al. |
| 2022/0091722 | A1* | 3/2022 | Faulkner ............. G06F 3/04815 |
| 2022/0100265 | A1* | 3/2022 | Kies ..................... G06V 40/107 |
| 2023/0056847 | A1* | 2/2023 | McMahon .............. G06F 3/012 |

FOREIGN PATENT DOCUMENTS

| | | | |
|---|---|---|---|
| KR | 10-1700569 | B1 | 1/2017 |
| KR | 10-2020-0080047 | A | 7/2020 |

OTHER PUBLICATIONS

Valentin et al., On-Device, Real-Time Hand Tracking with MediaPipe, Aug. 2019. (https://www.googblogs.com/on-device-real-time-hand-tracking-with-mediapipe/).

How Gesture Recognition Will Change Our Relationship With Tech Devices, Mar. 2019. (https://interestingengineering.com/how-gesture-recognition-will-change-our-relationship-with-tech-devices).

Jiang et al., A survey on trajectory clustering analysis, Feb. 20, 2018.

Zoltán et al., Expert Systems with Applications; Correlation based dynamic time warping of multivariate time series, Dec. 2012.

Guan et al., A review of moving object trajectory clustering algorithms, Mar. 2016.

European Search Report dated Jan. 23, 2025, issued in European Application No. 23747238.6.

Notice Of Allowance dated Jun. 8, 2026, issued in European Application No. 23747238.6.

* cited by examiner

S230

S510

OBTAIN FOREGROUND FRAMES AND BACKGROUND FRAMES BY EXTRACTING FOREGROUND OBJECTS FROM EACH OF FRAMES OF VIDEO

S520

EXTRACT FEATURE POINTS OF ONE OR MORE OBJECTS FROM FOREGROUND OBJECTS IN FOREGROUND FRAMES

500

502

START
OBTAIN FOV TRAJECTORY OF CAMERA
S810
OBTAIN ONE OR MORE OBJECT TRAJECTORIES
S820
CALCULATE CORRELATION COEFFICIENTS BETWEEN FOV TRAJECTORY OF CAMERA AND OBJECT TRAJECTORIES
S830
DETERMINE HAND CANDIDATES OF USER, BASED ON WHETHER CORRELATION COEFFICIENTS ARE HIGHER THAN OR EQUAL TO PRESET VALUE
S840
S260
R=0.54 (example)
0
−1
0
CORRELATION COEFFICIENT R
800

CAMERA FOV TRAJECTORY
LEFT HAND MOVEMENT TRAJECTORY
RIGHT HAND MOVEMENT TRAJECTORY 910
912
Camera movements
Left Hand movements
Right Hand movements 920
922
Camera movements
Left Hand movements
Right Hand movements CAMERA FOV TRAJECTORY
LEFT HAND MOVEMENT TRAJECTORY
RIGHT HAND MOVEMENT TRAJECTORY

930

932

Camera movements

Left Hand movements

Right Hand movements

940

942

Camera movements

Left Hand movements

Right Hand movements

1110
SENSOR
1112
HEAD MOVEMENT TRAJECTORY
X
y
z
1120
CAMERA
1122
IMAGE FRAMES
1130
OBJECT FEATURE EXTRACTION
1140
TRAJECTORY ESTIMATION AND HAND CANDIDATE DETERMINATION
1144
HAND MOVEMENT TRAJECTORY
1150
MATCHING
1160
GESTURE RECOGNITION
2000
HMD
Camera (s) FoV
Hands on the image
1132
User hands
Skipped
1154
1156

1112 HEAD MOVEMENT TRAJECTORY
X
y
z
1110
SENSOR
3000
WEARABLE DEVICE
y
z
x
1144
HAND MOVEMENT TRAJECTORY
X
y
z
1140
1144
HAND MOVEMENT TRAJECTORY
1160
1120
CAMERA
1122
IMAGE FRAMES
OBJECT FEATURE EXTRACTION
1130
TRAJECTORY ESTIMATION AND HAND CANDIDATE DETERMINATION
1150
MATCHING
GESTURE RECOGNITION
2000
HMD
Camera (s) FoV
Hands on the image
1132
User hands
User hands
1158
1156

1201
1202
1203
1210
CAMERA
1220
IMAGE FRAMES
1201-1
1202-1
1203-1
1230
HEAD/FACE RECOGNITION
1240
HAND RECOGNITION
1232
Movements data
Movements data
1242
1232-1
1232-2
1232-3
HEAD MOVEMENT ESTIMATION
1201-2
1202-2
1202-3
1203-2
1242-1
1242-2
HAND MOVEMENT ESTIMATION
1250
SKELETON-BASED HAND-FACE CONNECTION
1260
MOVEMENT PATTERN MATCHING
HAND-HEAD(FACE) MATCHING PER USER

METHOD AND ELECTRONIC DEVICE FOR DETERMINING USER'S HAND IN VIDEO

CROSS-REFERENCE TO RELATED APPLICATION(S)

This application is a continuation application, claiming priority under § 365(c), of an International application No. PCT/KR2023/000806, filed on Jan. 17, 2023, which is based on and claims the benefit of a Korean patent application number 10-2022-0011065, filed on Jan. 25, 2022, in the Korean Intellectual Property Office, and of a Korean patent application number 10-2022-0108652, filed on Aug. 29, 2022, in the Korean Intellectual Property Office, the disclosure of each of which is incorporated by reference herein in its entirety.

TECHNICAL FIELD

The disclosure relates to an electronic device for recognizing gestures by determining hands of a user in a video, and an operating method thereof.

BACKGROUND ART

As an interaction method for manipulating an electronic device, a control function using gesture recognition is being provided. The electronic device tracks hands in an image and/or a video, recognizes gestures, and performs control operations corresponding to the recognized gestures. When the electronic device performs gesture recognition, gestures by hands of people other than a user who desires to control the electronic device may be recognized in some cases.

The disclosure provides a method of performing gesture recognition by accurately determining hands of a user rather than hands of other people included in an image and/or a video, to provide user interaction through gesture recognition.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Solution to Problem

Aspects of the disclosure are to address at least the above-mentioned problems and/or disadvantages and to provide at least the advantages described below. Accordingly, an aspect of the disclosure is to provide an electronic device for recognizing gestures by determining hands of a user in a video, and an operating method thereof.

Additional aspects will be set forth in part in the description which follows and, in part, will be apparent from the description, or may be learned by practice of the presented embodiments.

In accordance with an aspect of the disclosure, a method, performed by an electronic device, of determining hands of a user in a video is provided. The method includes obtaining a video including a plurality of frames, by using a camera. The method may include estimating a field of view (FoV) trajectory indicating movements of a FoV of the camera, by using the frames of the video. The method may include detecting feature points of one or more objects in each of the frames of the video. The method may include estimating object trajectories indicating movements of the one or more objects, based on the feature points of the one or more objects. The method may include determining hand candidates of a user from among the one or more objects, based on the FoV trajectory of the camera and the object trajectories. The method may include obtaining a head movement trajectory indicating movements of a head of the user. The method may include determining a hand of the user, based on the head movement trajectory and the object trajectories corresponding to the hand candidates of the user. The method may include tracking the determined hand of the user in the video and recognizing a gesture.

In accordance with another aspect of the disclosure, an electronic device for determining hands of a user in a video is provided. The electronic device includes a communication interface, a camera, a memory configured to store one or more instructions, and a processor configured to execute the one or more instructions stored in the memory. The processor may be configured to obtain a video including a plurality of frames, by using the camera, when the one or more instructions are executed. The processor may be configured to estimate a field of view (FoV) trajectory of the camera, by using the frames of the video, when the one or more instructions are executed. The processor may be configured to detect feature points of one or more objects in each of the frames of the video, when the one or more instructions are executed. The processor may be configured to estimate object trajectories, based on the feature points of the one or more objects, when the one or more instructions are executed. The processor may be configured to determine hand candidates of a user from among the one or more objects, based on the FoV trajectory of the camera and the object trajectories, when the one or more instructions are executed. The processor may be configured to obtain a head movement trajectory of the user, when the one or more instructions are executed. The processor may be configured to determine a hand of the user, based on the head movement trajectory and the object trajectories corresponding to the hand candidates of the user, when the one or more instructions are executed. The processor may be configured to track the determined hand of the user in the video and recognize a gesture, when the one or more instructions are executed.

In accordance with another aspect of the disclosure, a computer-readable recording medium having recorded thereon a computer program for executing one of methods, performed by an electronic device and described above or below, of determining hands of a user in a video is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE OF DISCLOSURE

Figure 1:
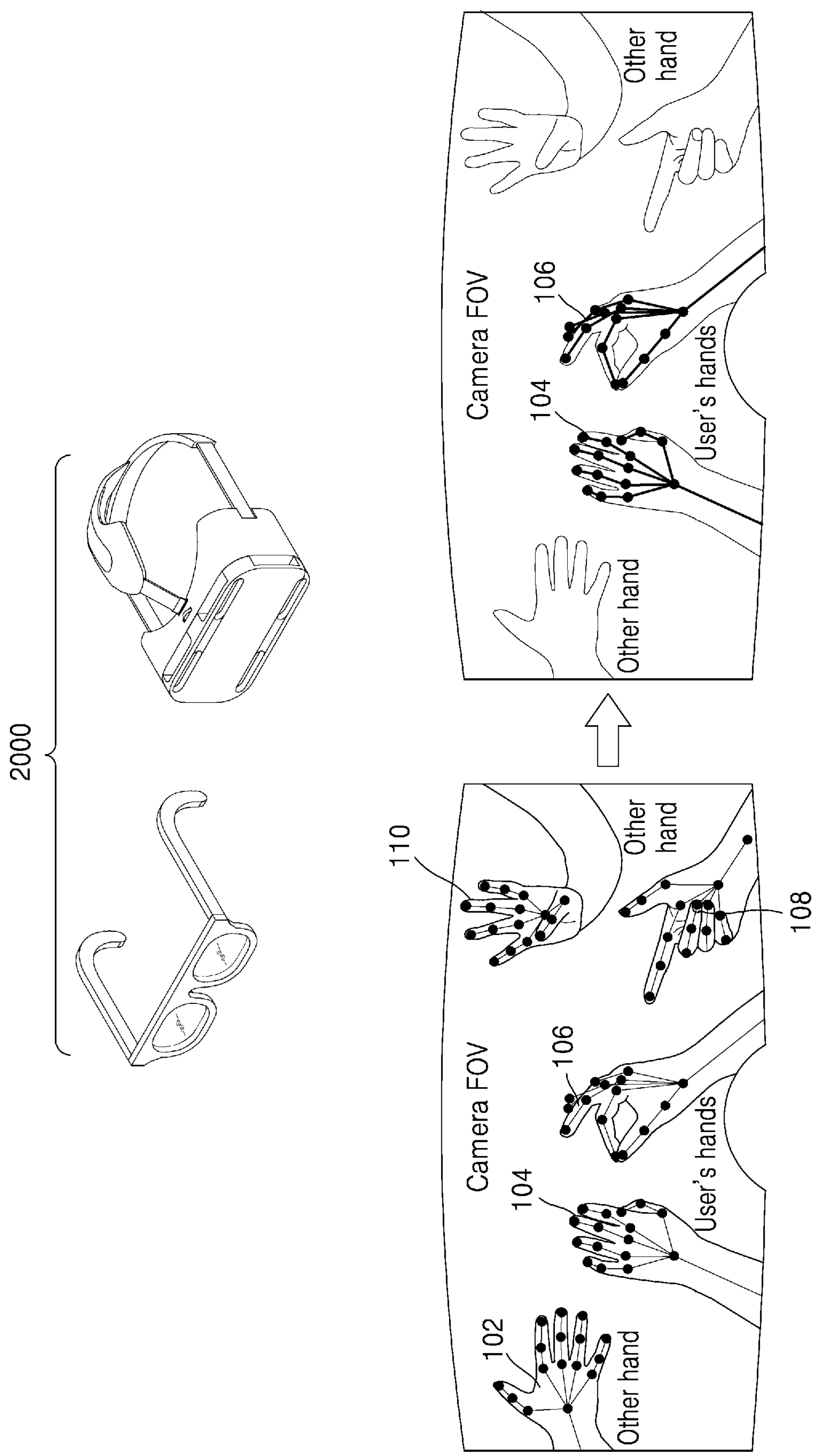
FIG. 1 is a view for briefly describing an operation, performed by an electronic device, of determining hands of a user, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in that case, the meanings of these terms may be described in relevant parts of the disclosure. Therefore, it is noted that the terms used herein are construed based on practical meanings thereof and the whole content of this specification, rather than being simply construed based on names of the terms.

All terms (including technical and scientific terms) used herein have the same meaning as generally understood by one of ordinary skill in the art. Terms such as "first" and "second" in the disclosure may be used to designate various elements, but the elements should not be limited by these terms. These terms are merely used to distinguish one element from another.

It will be understood that the terms "comprises," "comprising," "includes" and/or "including," when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

Hereinafter, the disclosure will be described in detail by explaining embodiments of the disclosure with reference to the attached drawings. The disclosure may, however, be embodied in many different forms and should not be construed as being limited to the embodiments of the disclosure set forth herein. In the drawings, parts not related to the disclosure are not illustrated for clarity of explanation, and like elements are denoted by like reference numerals throughout.

Reference will now be made in detail to embodiments of the disclosure, examples of which are illustrated in the accompanying drawings.

FIG. 1 is a view for briefly describing an operation, performed by an electronic device, of determining hands of a user, according to an embodiment of the disclosure.

Referring to FIG. 1, in an embodiment of the disclosure, the electronic device 2000 may be a head-wearable device such as a head mounted display (HMD) or augmented reality (AR) glasses. The electronic device 2000 may provide a user interface which recognizes hands of a user and operates by recognizing air gestures of the user.

When the electronic device 2000 provides gesture interaction, the electronic device 2000 may track hands and recognize gestures of a user having control and/or a user of the electronic device 2000. In this case, the electronic device 2000 may determine the hands of the user which serve as targets of gesture recognition.

Referring to a camera field of view (FoV) shown in FIG. 1, various objects, i.e., hands, may appear in the camera FoV of the electronic device 2000 according to an embodiment of the disclosure. For example, hands 102, 108, and 110 of other people and hands 104 and 106 of the user may be included in the camera FoV of the electronic device 2000.

In an embodiment of the disclosure, when the electronic device 2000 recognizes the hands 102, 108, and 110 of the other people included in the camera FoV and is controlled by gestures of the hands 102, 108, and 110 of the other people, the user of the electronic device 2000 may not properly use the electronic device 2000. To be controlled by gestures of the user, the electronic device 2000 may determine the hands 104 and 106 of the user in the FoV of the camera, and recognize gestures by tracking only the hands 104 and 106 of the user. In this case, the electronic device 2000 may execute control commands corresponding to types of the recognized gestures.

Because the electronic device 2000 does not recognize hands of other people as hands of the user, even when the people other than the user make hand gestures for controlling the electronic device 2000, the electronic device 2000 may not execute control commands. For example, the electronic device 2000 may not be controlled by gestures of the hands 102, 108, and 110 of the other people.

Specific operations, performed by the electronic device 2000, of determining the hands of the user will be described in detail below with reference to the other drawings.

Meanwhile, FIG. 1 and the other drawings assume that the electronic device 2000 is a head-wearable device. That is, the following description will be focused on examples in which the electronic device 2000 determines hands of a user on the basis of an egocentric FoV of the user. However, the disclosure is not limited thereto. Specifically, the electronic device 2000 may include different types of electronic devices including a camera and being controllable by gestures, e.g., a smartphone, a television (TV), and a robot. When the electronic device 2000 is a type of device other than a head-wearable device, the electronic device 2000 may capture a video of a user with a camera in a side view, and determine the user and a hand of the user included in the video, according to the disclosed embodiments of the disclosure. After the hand of the user is determined, the electronic device 2000 may recognize a gesture by tracking the hand of the user, and perform a control operation.

Figure 2:
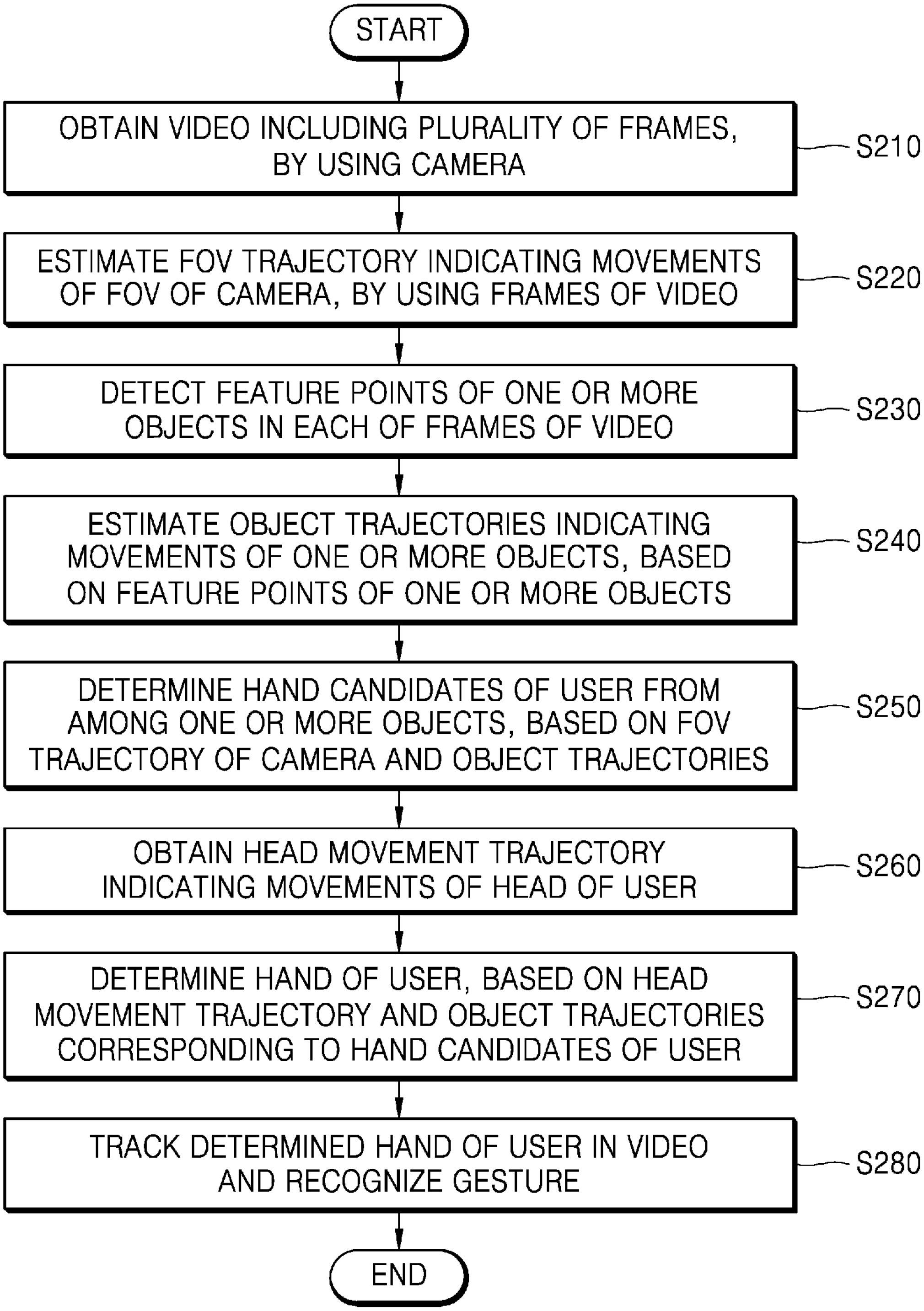
FIG. 2 is a flowchart for describing a method, performed by an electronic device, of determining hands of a user, according to an embodiment of the disclosure.

FIG. 2 is a flowchart for describing a method, performed by the electronic device, of determining hands of a user, according to an embodiment of the disclosure.

Referring to FIG. 2, in operation S210, the electronic device 2000 obtains a video including a plurality of frames, by using a camera. The electronic device 2000 may analyze the frames of the video obtained in real time while capturing the video by using the camera.

In an embodiment of the disclosure, the camera included in the electronic device 2000 may include one or more cameras. The electronic device 2000 may include, for example, a red green blue (RGB) camera or a depth camera, but is not limited thereto.

In operation S220, the electronic device 2000 estimates a FoV trajectory indicating movements of a FoV of the camera, by using the frames of the video.

In an embodiment of the disclosure, the electronic device 2000 may segment each of the frames included in the video, into a foreground and a background. Various algorithms may be used for the electronic device 2000 to segment the frame into the foreground and the background. For example, the electronic device 2000 may extract foreground objects from the frames of the video, and obtain foreground frames including the foreground objects and background frames excluding the foreground objects. The electronic device 2000 may estimate the FoV trajectory of the camera by using the obtained background frames. For example, the electronic device 2000 may compare pixels in the background frames. In this case, the background frames may be frames arranged in chronological order. The electronic device 2000 may obtain FoV movement information indicating movements of the FoV of the camera, by comparing pixels in the background frames. The electronic device 2000 may determine the FoV trajectory of the camera of the electronic device 2000, based on the FoV movement information.

In an embodiment of the disclosure, the electronic device 2000 may select frames to be segmented into foregrounds and backgrounds, from among the frames included in the video. For example, the electronic device 2000 may perform foreground and background segmentation by extracting only some frames at preset intervals from among the frames arranged in chronological order.

In an embodiment of the disclosure, the electronic device 2000 may estimate the FoV trajectory of the camera by using one or more sensors included in the electronic device 2000. For example, the electronic device 2000 may obtain movement information and rotation information of the camera by using an inertial measurement unit (IMU) sensor. The IMU sensor may include an acceleration sensor, a gyro sensor, a geomagnetic sensor, or the like, but is not limited thereto. The electronic device 2000 may determine the FoV trajectory of the camera of the electronic device 2000, based on the movement information and the rotation information of the electronic device 2000.

In operation S230, the electronic device 2000 detects feature points of one or more objects in each of the frames of the video.

In an embodiment of the disclosure, the electronic device 2000 may detect feature points of one or more foreground objects in the video by using the foreground frames obtained in operation S220. For example, when hands are included in the video and identified as foreground objects, the electronic device 2000 may detect feature points of the hands, e.g., knuckles, palms, and wrists. However, the above-mentioned feature points of the objects 'hands' are merely examples, and other feature points of the 'hands' may be detected. Alternatively, feature points defined for objects other than the 'hands' (e.g., heads or faces) may also be detected. In an embodiment of the disclosure, the electronic device 2000 may use an artificial intelligence (AI) model for detecting feature points of objects. In this case, the AI model for detecting feature points of objects may be trained using a training dataset annotated with feature points of objects belonging to a plurality of categories. In an embodiment of the disclosure, to detect feature points of objects, the electronic device 2000 may first identify a category of the objects, and then detect feature points corresponding to the identified category. For example, the electronic device 2000 may identify objects 'hands' in the foreground frames, and detect feature points of the 'hands.'

In operation S240, the electronic device 2000 estimates object trajectories indicating movements of the one or more objects, based on the feature points of the one or more objects. The electronic device 2000 may obtain movement information of the feature points of the one or more objects included in the video. For example, the electronic device 2000 may obtain movement information of one object (or feature points of the object) in the foreground frames, based on the feature points detected from the object. For example, the electronic device 2000 may generate movement information of one object by using a set of feature points detected from the object and/or a center point of the feature points. The electronic device 2000 may determine a trajectory of the object, based on the movement information of the object.

In operation S250, the electronic device 2000 determines hand candidates of a user from among the one or more objects, based on the FoV trajectory of the camera and the object trajectories.

In an embodiment of the disclosure, when a plurality of objects are included in the video, object trajectories individually corresponding to the plurality of objects may be obtained according to the afore-described embodiments of the disclosure. For example, a hand of a user of the electronic device 2000 and hands of people other than the user may be included in the video. To recognize only the hand of the user without recognizing the hands of the other people, the electronic device 2000 may determine the hand candidates of the user. The hand candidates of the user may include, for example, the hand of the user and the hands of the other people. The electronic device 2000 may determine the hand of the user from among the hand candidates of the user.

The electronic device 2000 may determine an object trajectory estimated as a trajectory indicating movements of the hand of the user, from among the object trajectories. For example, when the electronic device 2000 is a head-wearable HMD, a correlation coefficient between the FoV trajectory of the camera based on movements of a head of the user and a hand trajectory based on movements of the hand of the user may be high. To determine the hand candidates of the user from among the one or more objects in the video, the electronic device 2000 may calculate correlation coefficients between the FoV trajectory of the camera and the object trajectories. Various algorithms may be used for the electronic device 2000 to calculate the correlation coefficients between the trajectories. In an embodiment of the disclosure, the electronic device 2000 may perform signal processing for calculating the correlation coefficients. The electronic device 2000 may use, for example, dynamic time warping (DTW) for the signal processing, but is not limited thereto.

The electronic device 2000 may determine the hand candidates of the user from among the one or more objects, based on whether the correlation coefficients between the FoV trajectory of the camera and the object trajectories are higher than or equal to a preset value. The electronic device 2000 may determine which object from among the hand candidates of the user is the hand of the user, by further performing operations described below.

In operation S260, the electronic device 2000 obtains a head movement trajectory indicating movements of the head of the user.

In an embodiment of the disclosure, the electronic device 2000 may obtain the head movement trajectory of the user by using one or more sensors included in the electronic device 2000. For example, when the electronic device 2000 is a head-wearable HMD, the electronic device 2000 may obtain head movement information of the user by using an IMU sensor. The electronic device 2000 may determine the head movement trajectory of the user who is wearing the electronic device 2000 on his/her head, based on the head movement information indicating movements of the head of the user.

In an embodiment of the disclosure, the electronic device 2000 may obtain the head movement trajectory of the user by using the frames included in the video. For example, the electronic device 2000 may be a device including a camera to photograph the user. The electronic device 2000 may obtain video frames in real time by photographing the user, segment the video frames into foreground and background frames, and detect head feature points of humans from foreground objects. The electronic device 2000 may obtain the head movement information of the user in the foreground frames, based on the head feature points. The electronic device 2000 may determine the head movement trajectory of the user, based on the head movement information of the user.

In operation S270, the electronic device 2000 determines a hand of the user, based on the head movement trajectory and the object trajectories corresponding to the hand candidates of the user.

In an embodiment of the disclosure, the electronic device 2000 may obtain the object trajectories corresponding to the hand candidates determined in operation S250. The electronic device 2000 may compare the head movement trajectory of the user with the object trajectories corresponding to the hand candidates of the user. For example, the electronic device 2000 may calculate correlation coefficients between the head movement trajectory of the user and the object trajectories corresponding to the hand candidates of the user. Various algorithms may be used for the electronic device 2000 to calculate the correlation coefficients between the trajectories. The electronic device 2000 may use, for example, DTW, but is not limited thereto.

The electronic device 2000 may determine the hand of the user from among the hand candidates of the user, based on whether the correlation coefficients between the head movement trajectory of the user and the object trajectories corresponding to the hand candidates of the user are higher than or equal to a preset value.

In operation S280, the electronic device 2000 tracks the determined hand of the user in the video and recognizes a gesture.

The electronic device 2000 may track the hand of the user by recognizing only the hand of the user who is using the electronic device 2000, and recognize a gesture made by the hand of the user. In an embodiment of the disclosure, a preset control command for the electronic device 2000 may be stored for each type of the gesture of the hand of the user. The electronic device 2000 may execute a control command for controlling the electronic device 2000, based on the recognized gesture of the hand of the user. In this case, even when people other than the user of the electronic device 2000 make hand gestures for controlling the electronic device 2000, the electronic device 2000 does not recognize hands of the other people as hands of the user, and thus may not execute control commands.

Figure 3:
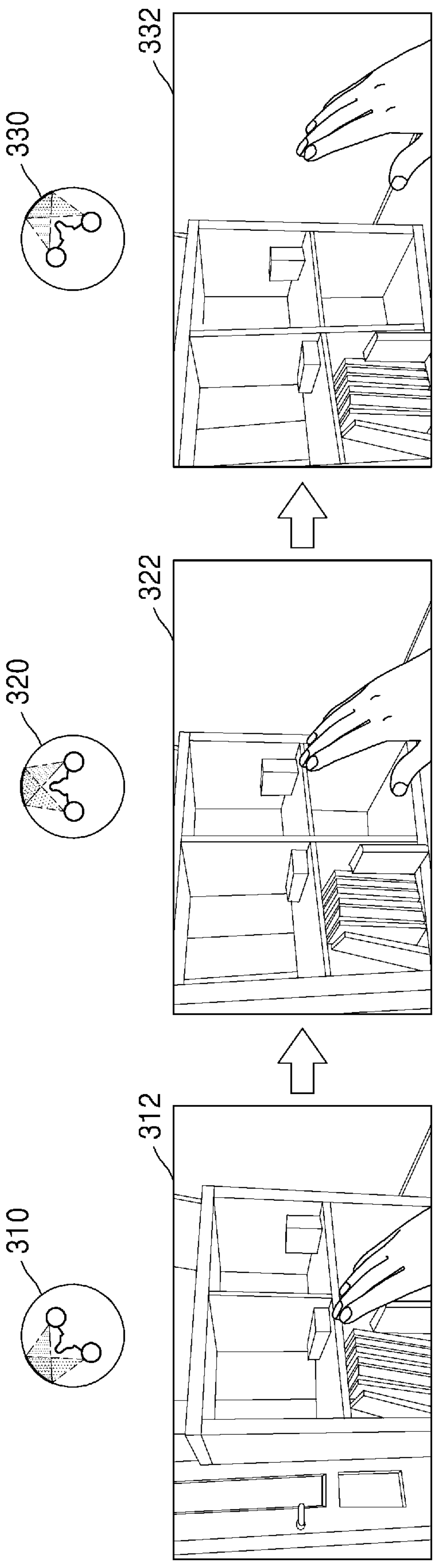
FIG. 3 is a view for describing body movements of a user of an electronic device, according to an embodiment of the disclosure.

FIG. 3 is a view for describing body movements of a user of the electronic device, according to an embodiment of the disclosure.

FIG. 3 assumes that the electronic device 2000 is a head-wearable HMD.

In an embodiment of the disclosure, when a user wears the electronic device 2000 on his/her head for various purposes, e.g., virtual reality, augmented reality, or human-computer interaction, the user may control the electronic device 2000 through gesture manipulation. During the gesture manipulation by the user, body parts (e.g., hands, a head, and a torso) of the user move in partial synchronization.

For example, the electronic device 2000 obtains a video by capturing a FoV of the user by using a camera. The video includes a plurality of frames (e.g., a first frame 312, a second frame 322, and a third frame 332). However, although only three frames are shown for convenience of explanation, more frames may be included in the video.

Referring to FIG. 3, the first frame 312 is a frame captured when the FoV of the user is directed to a left side 310. The second frame 322 is a frame captured when the FoV of the user is directed to a front side 320. The third frame 332 is a frame captured when the FoV of the user is directed to a right side 330.

The user of the electronic device 2000 may make a gesture of moving his/her hand from left to right. Referring to the first frame 312, the second frame 322, and the third frame 332, it is shown that the user is moving his/her hand from left to right while viewing the left side 310, the front side 320, and then the right side 330. As described above, when the user controls the electronic device 2000 through a gesture, the body parts (e.g., the hands, the head, and the torso) of the user move in partial synchronization. In the disclosure, based on the partial synchronization of the body parts of the user, a hand of the user may be distinguished from hands of people other than the user by analyzing trajectories of the body parts of the user.

Figure 4:
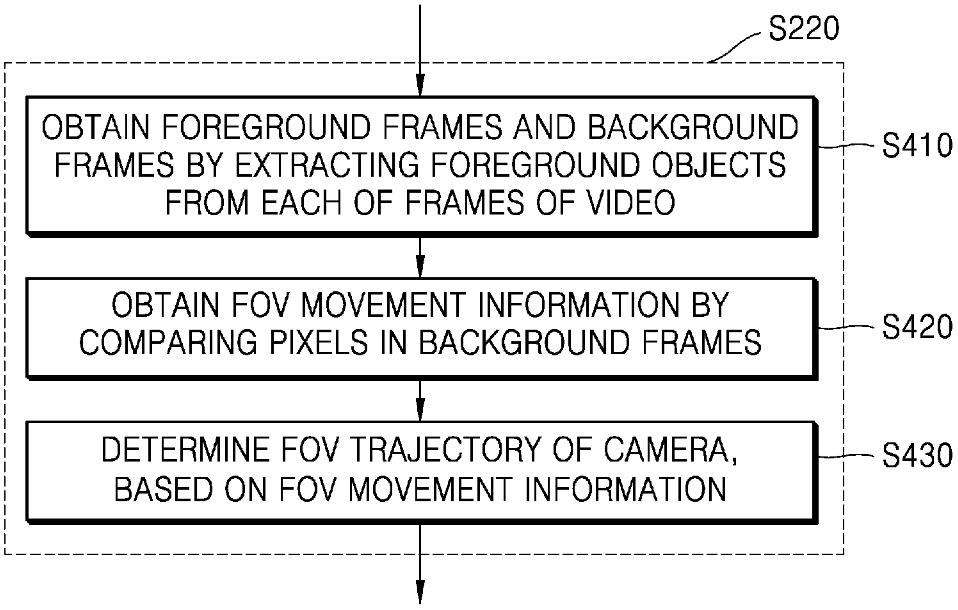
FIG. 4 is a flowchart for describing an operation, performed by an electronic device, of obtaining a field of view (FoV) trajectory of a camera, according to an embodiment of the disclosure.

FIG. 4 is a flowchart for describing an operation, performed by the electronic device, of obtaining a FoV trajectory of a camera, according to an embodiment of the disclosure.

Referring to FIG. 4, operations 8410 to 8430 may correspond to operation 8220 of FIG. 2.

In operation 8410, the electronic device 2000 obtains foreground frames and background frames by extracting foreground objects from each of frames of a video.

In an embodiment of the disclosure, the electronic device 2000 may detect an object by using an AI model for detecting objects in a frame of a video (hereinafter referred to as an object detection model). The object detection model may be an AI model for receiving an image and outputting a result of detecting objects (e.g., hands or faces). The object detection model may be an AI model trained using a training dataset annotated with information related to objects (e.g., categories of the objects) to detect the objects. The electronic device 2000 may detect an object in each frame of the video, identify an edge area of the object, and then generate a foreground frame by segmenting an area of the detected object from the frame. The electronic device 2000 may generate a background frame by segmenting a remaining area excluding the detected object from the frame.

In an embodiment of the disclosure, the electronic device 2000 may generate the foreground frames and the background frames by using a foreground/background segmentation algorithm. Such a method may be easily understood by one of ordinary skill in the art, and thus a description thereof is not provided herein.

Meanwhile, although the frame and the object are described in a singular form in operation 8410, the singular form is merely an example for convenience of explanation. One or more frames may be included in the video, and one or more objects may be included in each of the frames. The afore-described embodiment of the disclosure may be equally applied to one or more frames and/or one or more objects.

In operation 8420, the electronic device 2000 obtains FoV movement information indicating movements of a FoV of a camera, by comparing pixels in the background frames. The FoV movement information may include information related to three-dimensional (3D) movements including movements and rotations of the camera.

In an embodiment of the disclosure, the electronic device 2000 obtains the background frames by using the frames included in the video. The electronic device 2000 may obtain the FoV movement information of the camera of the electronic device 2000 by comparing pixels between adjacent background frames. For example, the electronic device 2000 may obtain the FoV movement information indicating in which direction the FoV of the camera is moved, based on pixels having different values other than repeated pixels (pixels having equal or similar values) between the adjacent frames.

In an embodiment of the disclosure, the FoV movement information of the camera of the electronic device 2000 may be generated using sensor data obtained from a sensor included in the electronic device 2000. For example, the electronic device 2000 may obtain movement information and rotation information of the camera by using an IMU sensor. The IMU sensor may include an acceleration sensor, a gyro sensor, a geomagnetic sensor, or the like, but is not limited thereto. The electronic device 2000 may generate the FoV movement information of the camera of the electronic device 2000, based on the movement information and the rotation information of the electronic device 2000.

In operation S430, the electronic device 2000 determines a FoV trajectory of the camera, based on the FoV movement information.

The electronic device 2000 may generate the FoV trajectory of the camera of the electronic device 2000 in a 3D space, based on the FoV movement information. For example, when the electronic device 2000 is the above-mentioned HMD, the FoV trajectory of the camera may refer to a trajectory of a FoV viewed by a user wearing the HMD while rotating his/her head or moving in a 3D space.

Figure 5:
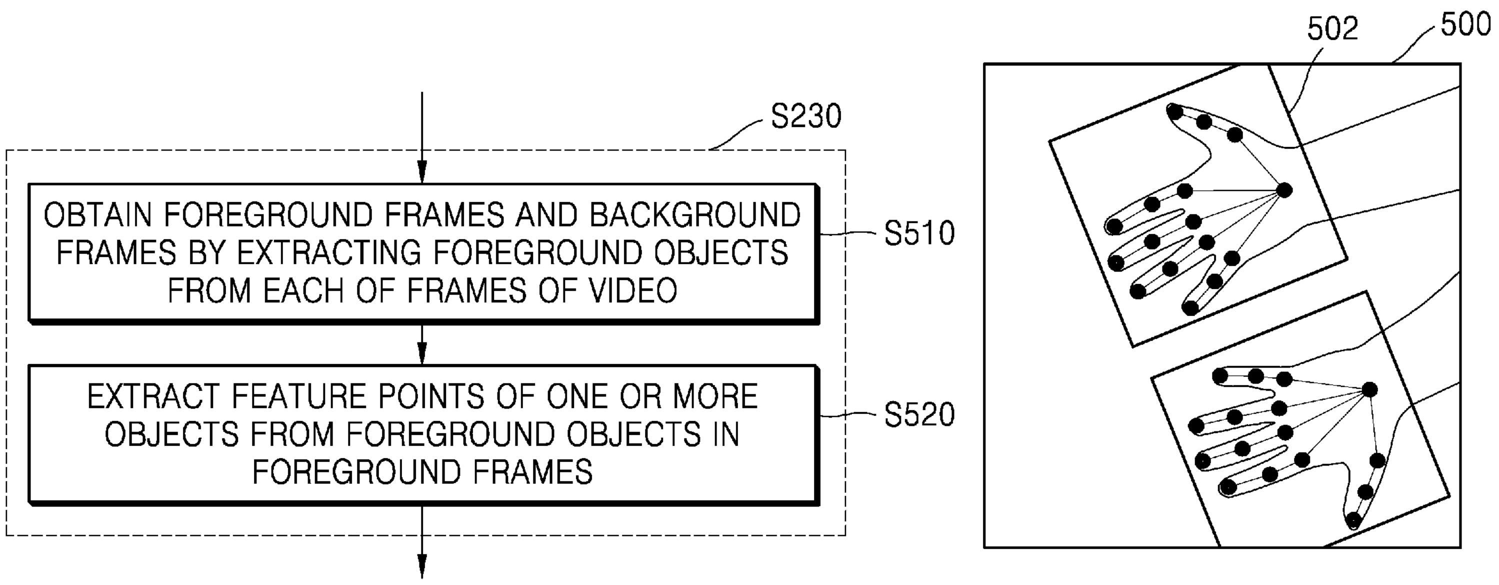
FIG. 5 is a flowchart for describing an operation, performed by an electronic device, of extracting feature points of objects, according to an embodiment of the disclosure.

FIG. 5 is a flowchart for describing an operation, performed by the electronic device, of extracting feature points of objects, according to an embodiment of the disclosure.

Referring to FIG. 5, operations S510 and S520 may correspond to operation S230 of FIG. 2.

In operation S510, the electronic device 2000 obtains foreground frames and background frames by extracting foreground objects from each of frames of a video. The operation, performed by the electronic device 2000, of generating the foreground frames is described above in relation to operation S410 of FIG. 4, and thus a repeated description thereof is not provided herein.

In operation S520, the electronic device 2000 extracts feature points of one or more objects from the foreground objects in the foreground frames.

In an embodiment of the disclosure, the electronic device 2000 may use an AI model for detecting feature points of objects (hereinafter referred to as an object feature detection model). In this case, the AI model for detecting feature points of objects may be trained using a training dataset annotated with feature points of objects belonging to a plurality of categories. For example, the electronic device 2000 may detect feature points of 'hands 502' which are foreground objects of a foreground frame 500, e.g., knuckles, palms, and wrists. However, the above-mentioned feature points of the objects 'hands 502' are merely examples, and other feature points of the 'hands 502' may be detected. Alternatively, feature points defined for objects other than the 'hands 502' (e.g., heads or faces) may also be detected.

Figure 6:
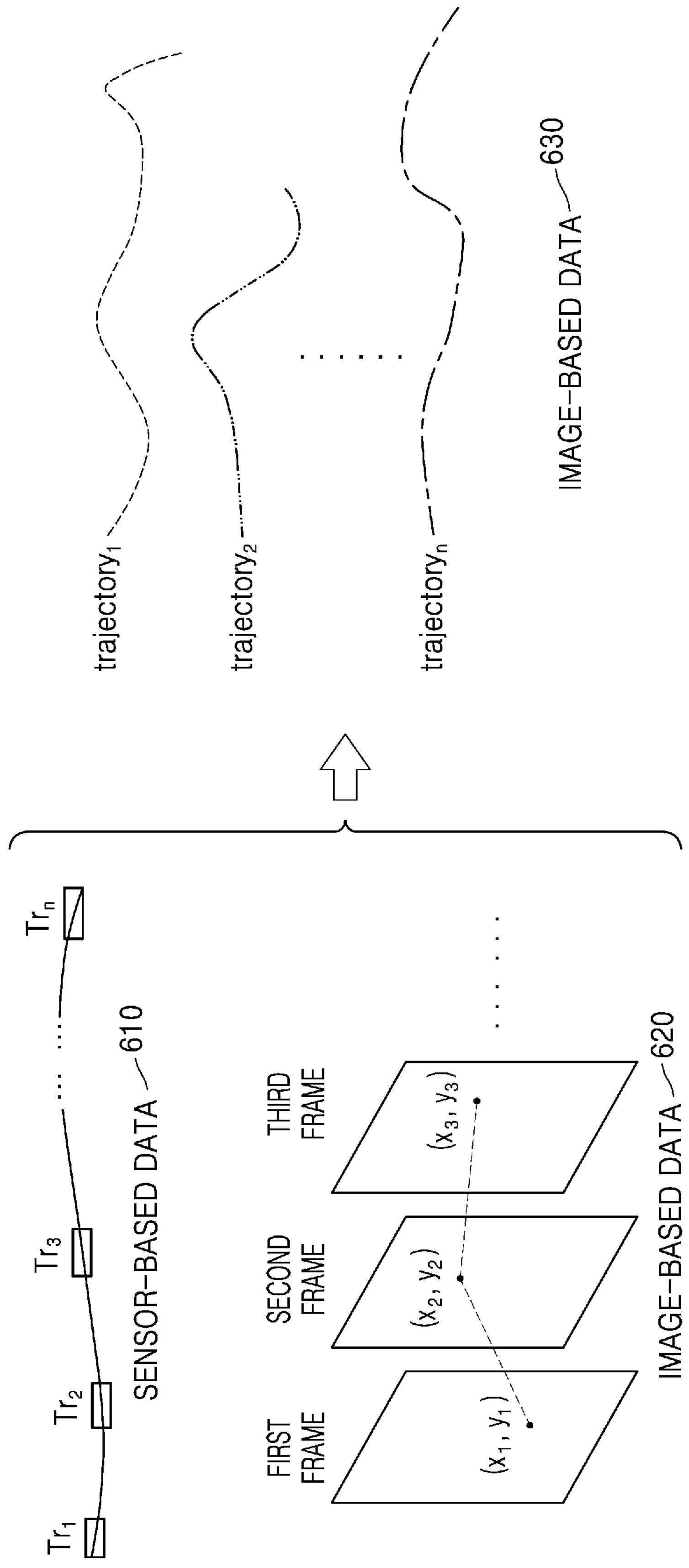
FIG. 6 is a view for describing trajectories used by an electronic device, according to an embodiment of the disclosure.

FIG. 6 is a view for describing trajectories used by the electronic device, according to an embodiment of the disclosure.

Referring to FIG. 6, in an embodiment of the disclosure, trajectories 630 may be generated using various types of data. For example, the electronic device 2000 may obtain sensor-based data 610 by using an IMU sensor. The sensor-based data 610 may be data sensed in chronological order. Alternatively, the electronic device 2000 may obtain image-based data 620 based on video frames (e.g., first, second, and third frames).

In an embodiment of the disclosure, the electronic device 2000 may generate the trajectories 630, based on the sensor-based data 610.

For example, the electronic device 2000 may obtain the sensor-based data 610 from a sensor (e.g., an IMU sensor) located on a head of a user, and generate a head movement trajectory of the user (i.e., the trajectories 630). In this case, the sensor located on the head of the user may be a sensor included in an HMD when the electronic device 2000 is the HMD, but is not limited thereto, and a separate sensor may be located on the head of the user to provide the sensor-based data 610 to the electronic device 2000.

Alternatively, the electronic device 2000 may obtain the sensor-based data 610 from a sensor (e.g., an IMU sensor) located on a hand of the user, and generate a hand movement trajectory of the user (i.e., the trajectories 630). In this case, the sensor located on the hand of the user may be a wearable device (e.g., a smartwatch) connected to the electronic device 2000 through wired/wireless communication, but is not limited thereto, and a separate sensor may be located on the hand of the user to provide the sensor-based data 610 to the electronic device 2000.

Alternatively, the electronic device 2000 may obtain the sensor-based data 610 from a sensor (e.g., an IMU sensor) located adjacent to a camera of the electronic device 2000, and generate a FoV trajectory of the camera (i.e., the trajectories 630). A description thereof is provided above, and thus is not repeated herein.

In an embodiment of the disclosure, the electronic device 2000 may generate the trajectories 630, based on the image-based data 620.

For example, the electronic device 2000 may generate a FoV trajectory of a camera (i.e., the trajectories 630) by using the image-based data 620 generated based on the video frames (e.g., the first, second, and third frames). In this case, the image-based data 620 may include the above-described FoV movement information obtained based on the background frames. A description thereof is provided above, and thus is not repeated herein.

Alternatively, the electronic device 2000 may generate an object trajectory (i.e., the trajectories 630) by using the image-based data 620 generated based on the video frames (e.g., the first, second, and third frames). In this case, the image-based data 620 may include the above-described object feature point information obtained based on the foreground frames. Meanwhile, the object feature point information may include feature points of a head, a face, or a hand of the user, and the object trajectory may include a head (face) movement trajectory or a hand movement trajectory. A description thereof is provided above, and thus is not repeated herein.

Figure 7A:
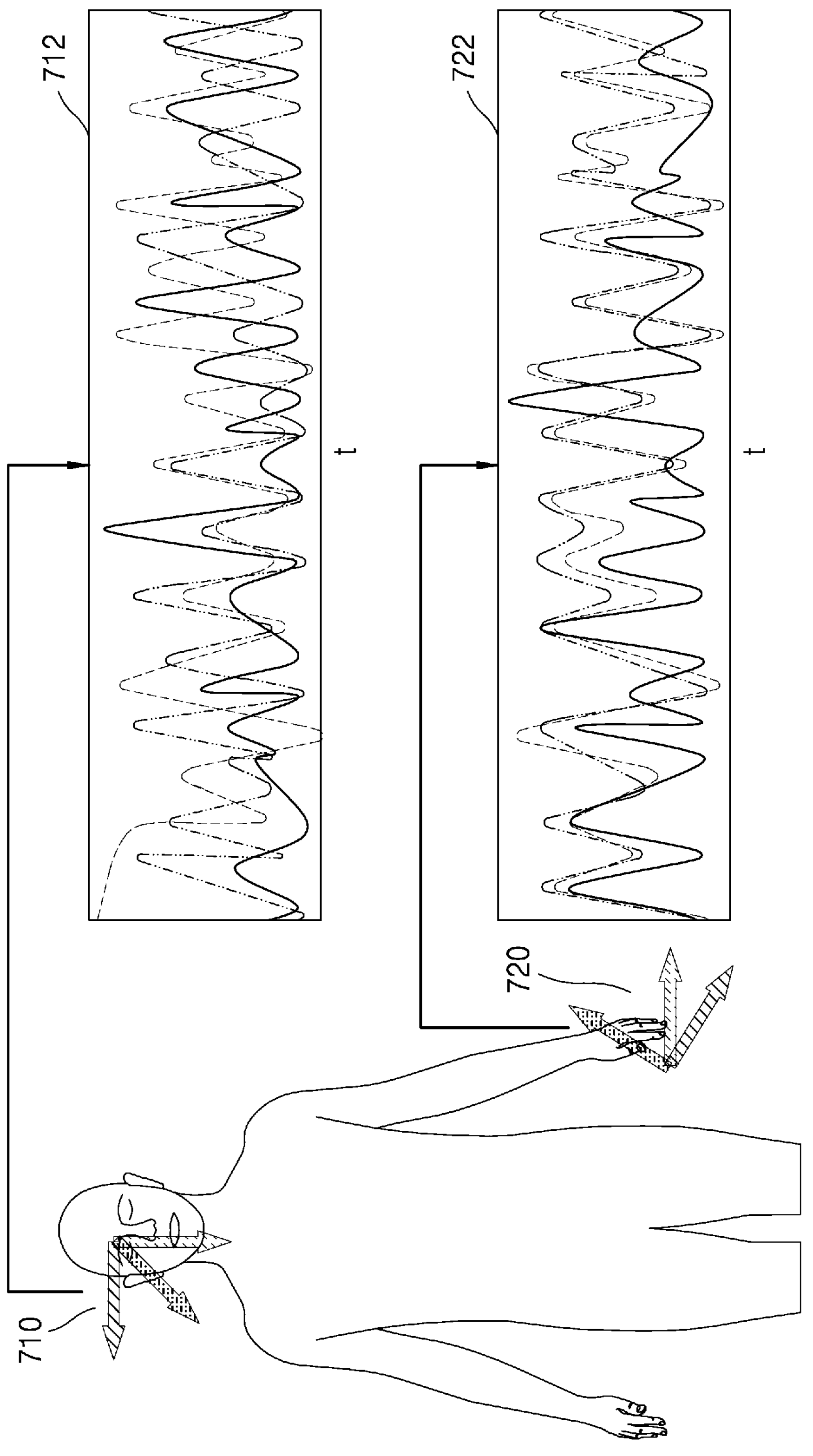
FIG. 7A is a view for describing an operation, performed by an electronic device, of obtaining sensor data, according to an embodiment of the disclosure.
Figure 7B:
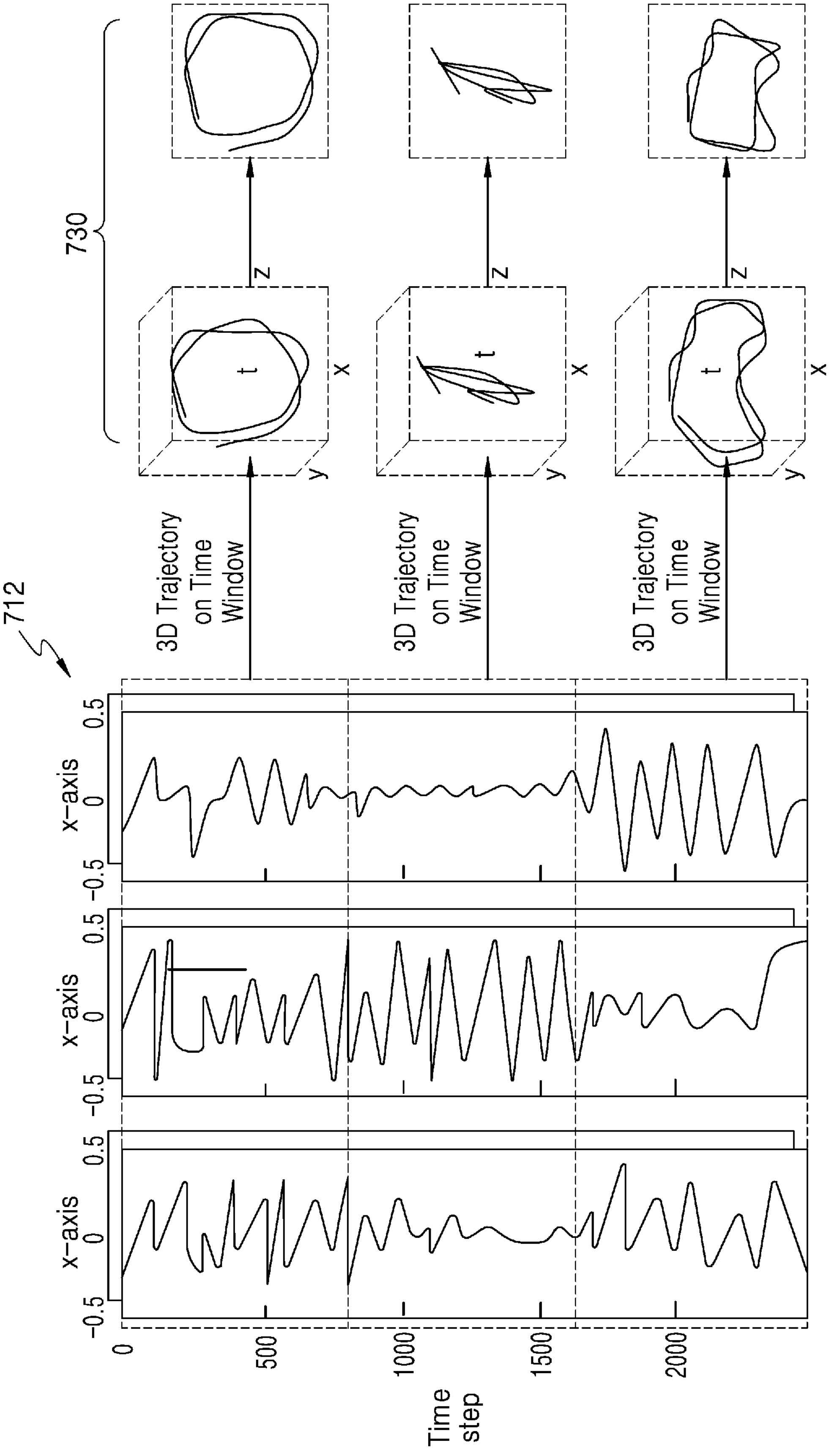
FIG. 7B is a view for describing an operation, performed by an electronic device, of generating trajectories based on sensor data, according to an embodiment of the disclosure.

FIGS. 7A and 7B are views for describing an operation, performed by the electronic device, of generating trajectories based on sensor data, according to various embodiments of the disclosure.

FIG. 7A is a view for describing an operation, performed by the electronic device 2000, of obtaining sensor data, according to an embodiment of the disclosure.

Referring to FIG. 7A, the electronic device 2000 according to an embodiment of the disclosure may obtain first sensor data 712 from a first sensor 710 located on a head of a user. The first sensor 710 may be a sensor included in an HMD when the electronic device 2000 is the HMD, but is not limited thereto, and a separate first sensor 710 may be located on the head of the user to provide the first sensor data 712 to the electronic device 2000. The first sensor data 712 may include movement information and/or rotation information in x, y, and z axes over time. The electronic device 2000 may generate a head movement trajectory of the user, based on the first sensor data 712 obtained from the first sensor 710 located on the head of the user. A further description thereof will be provided below with reference to FIG. 7B.

The electronic device 2000 according to an embodiment of the disclosure may obtain second sensor data 722 from a second sensor 720 located on a hand of the user. The second sensor 720 may be a wearable device (e.g., a smartwatch) connected to the electronic device 2000 through wired/wireless communication, but is not limited thereto, and a separate sensor may be located on the hand of the user to provide the second sensor data 722 to the electronic device 2000. The second sensor data 722 may include movement information and/or rotation information in x, y, and z axes over time. The electronic device 2000 may generate a hand movement trajectory of the user, based on the second sensor data 722 obtained from the second sensor 720 located on the hand of the user. A further description thereof will be provided below with reference to FIG. 7B.

FIG. 7B is a view for describing an operation, performed by the electronic device 2000, of generating trajectories based on sensor data, according to an embodiment of the disclosure.

Because the principles of generating a head movement trajectory and a hand movement trajectory based on the first sensor data 712 and the second sensor data 722 by the electronic device 2000 according to an embodiment of the disclosure are the same, only the first sensor data 712 is described herein for convenience of explanation.

Referring to FIG. 7B, in an embodiment of the disclosure, the first sensor data 712 may include information indicating an x-axis movement, a y-axis movement, and a z-axis movement in each time step. In an embodiment of the disclosure, the electronic device 2000 may generate movement trajectories 730, based on the first sensor data 712. According to the above-described example, the first sensor data 712 is data obtained from the first sensor 710 located on a head of a user, and thus the movement trajectories 730 may be head movement trajectories of the user.

In an embodiment of the disclosure, the electronic device 2000 may store the trajectories 730 as 3D trajectories including 3D information in x, y, and z axes. Alternatively, the electronic device 2000 may store two-dimensional (2D)

trajectories by simplifying the 3D trajectories. The electronic device 2000 may use the 3D trajectories and/or the 2D trajectories in a subsequent process to calculate correlation coefficients between trajectories.

Meanwhile, although the example in which the head movement trajectories of the user are generated using the first sensor data 712 is described in relation to FIG. 7B, similarly, the electronic device 2000 may generate hand movement trajectories of the user by using the second sensor data 722.

Figure 8:
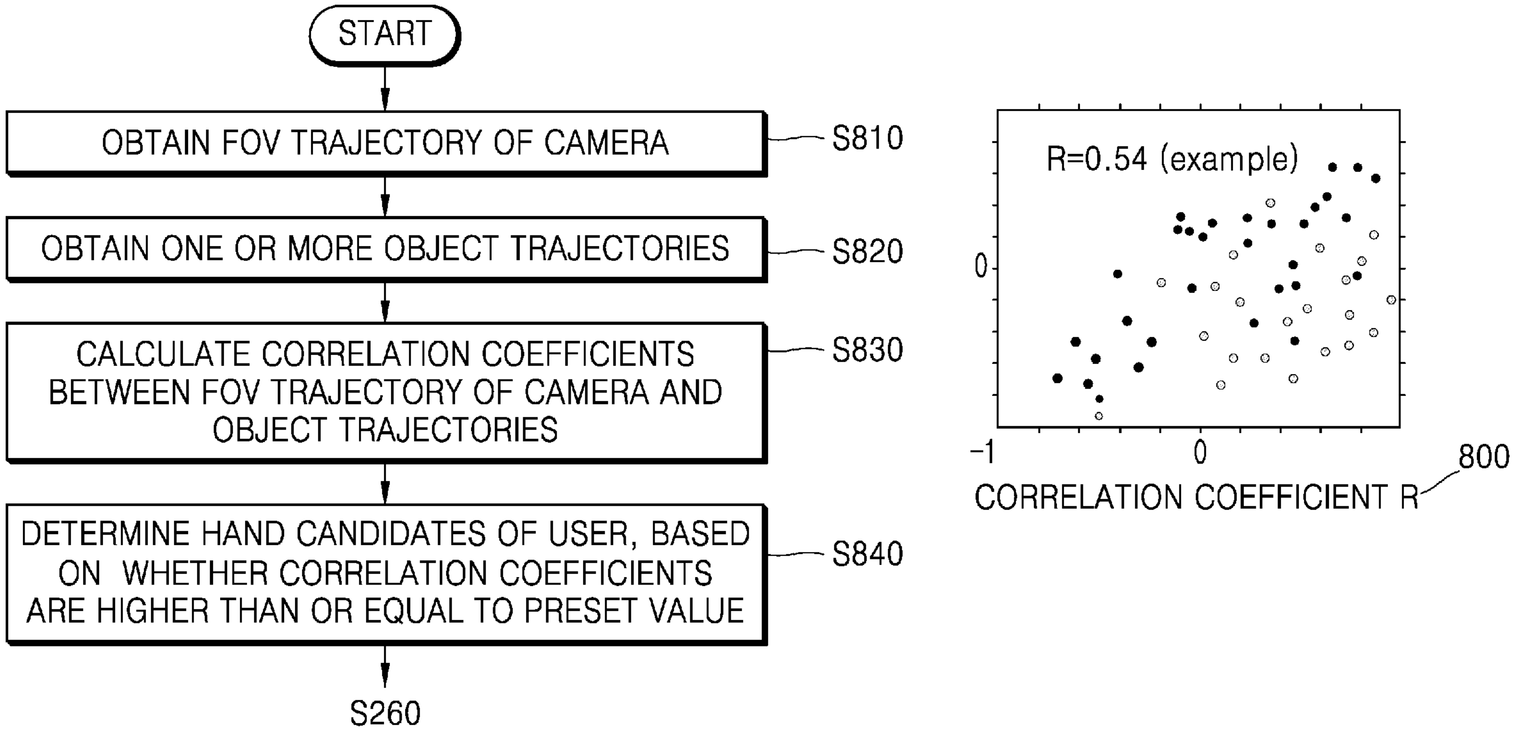
FIG. 8 is a view for describing an operation, performed by an electronic device, of determining hand candidates of a user, according to an embodiment of the disclosure.

FIG. 8 is a view for describing an operation, performed by the electronic device, of determining hand candidates of a user, according to an embodiment of the disclosure.

Referring to FIG. 8, in operation S810, the electronic device 2000 obtains a FoV trajectory of a camera of the electronic device 2000. The electronic device 2000 may generate the FoV trajectory of the camera, based on image-based data and/or sensor-based data. Specific operations, performed by the electronic device 2000, of obtaining the FoV trajectory of the camera are described above, and thus a repeated description thereof is not provided herein.

In operation S820, the electronic device 2000 obtains one or more object trajectories. The electronic device 2000 may detect objects in frames of a video, and detect feature points of the objects. The electronic device 2000 may generate the one or more object trajectories, based on the detected objects and/or the detected feature points of the objects. Specific operations, performed by the electronic device 2000, of obtaining the object trajectories are described above, and thus a repeated description thereof is not provided herein.

In operation S830, the electronic device 2000 calculates correlation coefficients 800 between the FoV trajectory of the camera and the object trajectories. The electronic device 2000 may use various algorithms for finding correlations. The electronic device 2000 may perform signal processing for calculating the correlation coefficients 800. The electronic device 2000 may use, for example, DTW for the signal processing, but is not limited thereto. The electronic device 2000 according to an embodiment of the disclosure may filter out only object trajectories having high correlations with the FoV trajectory of the camera, from among the trajectories of the objects included in the video.

In operation S840, the electronic device 2000 determines hand candidates of a user, based on whether the correlation coefficients 800 are higher than or equal to a preset value. According to the above-described example, because body parts (e.g., hands, a head, and a torso) of a user move in partial synchronization, when the user wears an HMD and performs gesture manipulation, the FoV trajectory of the camera is similar to a hand movement trajectory of the user. The electronic device 2000 may determine objects corresponding to object trajectories having correlation coefficients 800 higher than or equal to the preset value (e.g., 0.54) with the FoV trajectory of the camera, as the hand candidates of the user.

Figure 9A:
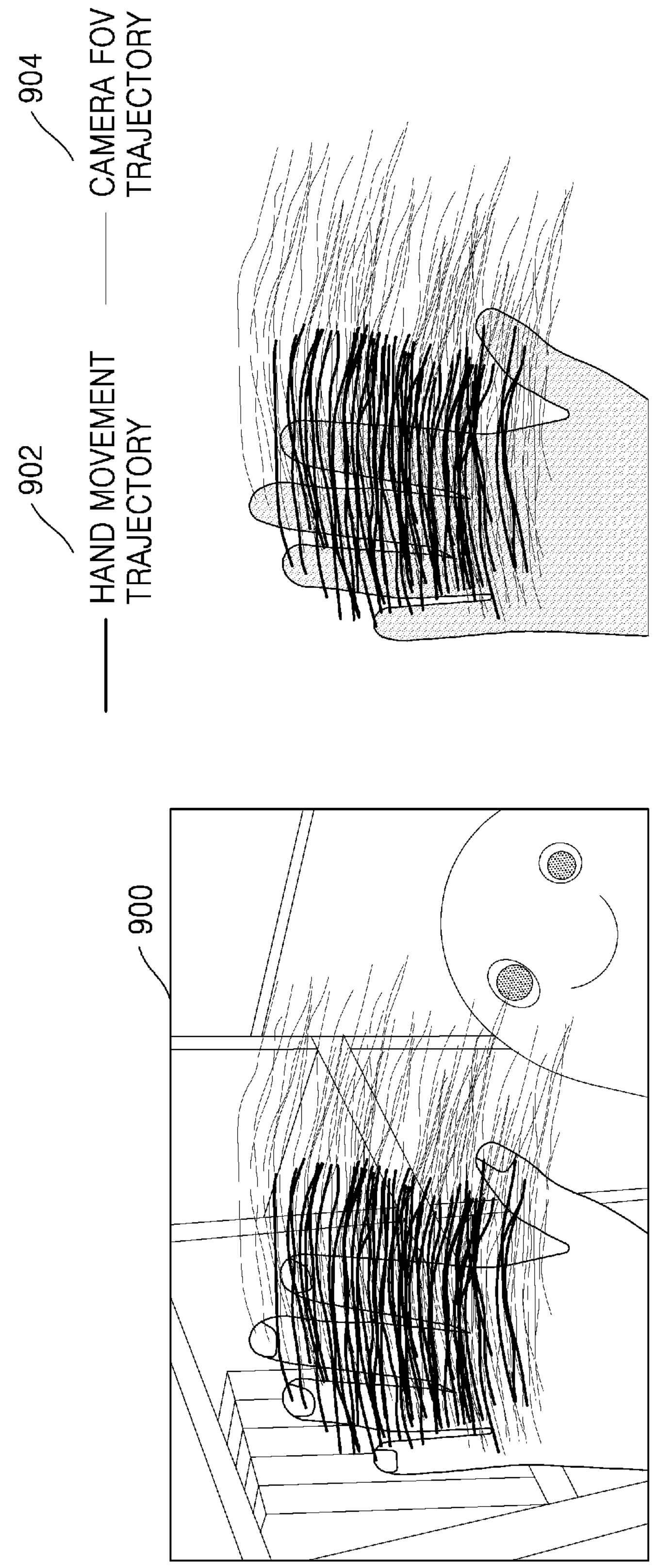
FIG. 9A is a view for describing an operation, performed by an electronic device, of comparing a FoV trajectory of a camera with a hand movement trajectory of a user, according to an embodiment of the disclosure.

FIG. 9A is a view for describing an operation, performed by the electronic device, of comparing a FoV trajectory of a camera with a hand movement trajectory of a user, according to an embodiment of the disclosure.

FIG. 9A assumes that an object in a video is a 'hand' and thus an object trajectory obtained according to the afore-described embodiments of the disclosure is a 'hand movement trajectory.'

An image 900 referring to FIG. 9A is an image for describing that a user wears an HMD as the electronic device 2000 and controls the electronic device 2000 by using a gesture.

In an embodiment of the disclosure, the user of the electronic device 2000 may input a gesture to control the electronic device 2000. For example, as shown in the image 900 of FIG. 9A, the user of the electronic device 2000 may input a gesture of repeatedly moving his/her left hand from side to side. The electronic device 2000 recognizes the gesture of the user, and executes a control command corresponding to the gesture. For example, the electronic device 2000 may recognize that the hand of the user is a 'left hand' and that the gesture is the 'side to side gesture', and execute a control command corresponding to the gesture.

The electronic device 2000 according to an embodiment of the disclosure may compare a hand movement trajectory 902 of the user with a FoV trajectory 904 of a camera, and calculate a correlation coefficient between the hand movement trajectory 902 and the FoV trajectory 904 of the camera. As shown in FIG. 9A, the number of hand movement trajectories estimated by the electronic device 2000 based on hand feature points (i.e., the number of object trajectories estimated based on object feature points, according to the afore-described embodiments of the disclosure) may be a plural number. The electronic device 2000 according to an embodiment of the disclosure determines hand candidates of the user, based on whether correlation coefficients are higher than or equal to a preset value. In this case, hand movement trajectories corresponding to the determined hand candidates of the user are used.

In an embodiment of the disclosure, the electronic device 2000 may previously perform signal processing to calculate the correlation coefficients. For example, the electronic device 2000 may use a DTW algorithm. The DTW is an algorithm for measuring similarity between two temporal wavelengths with different speeds in one-dimensional (1D) time series signals, and the similarity between two sequences S1 and S2 may be calculated by calculating a distance between sample points corresponding to the two sequences. Alternatively, the electronic device 2000 may use a hidden Markov model (HMM) to process sequential data such as trajectories, but the signal processing algorithm used by the electronic device 2000 is not limited thereto.

Figure 9B:
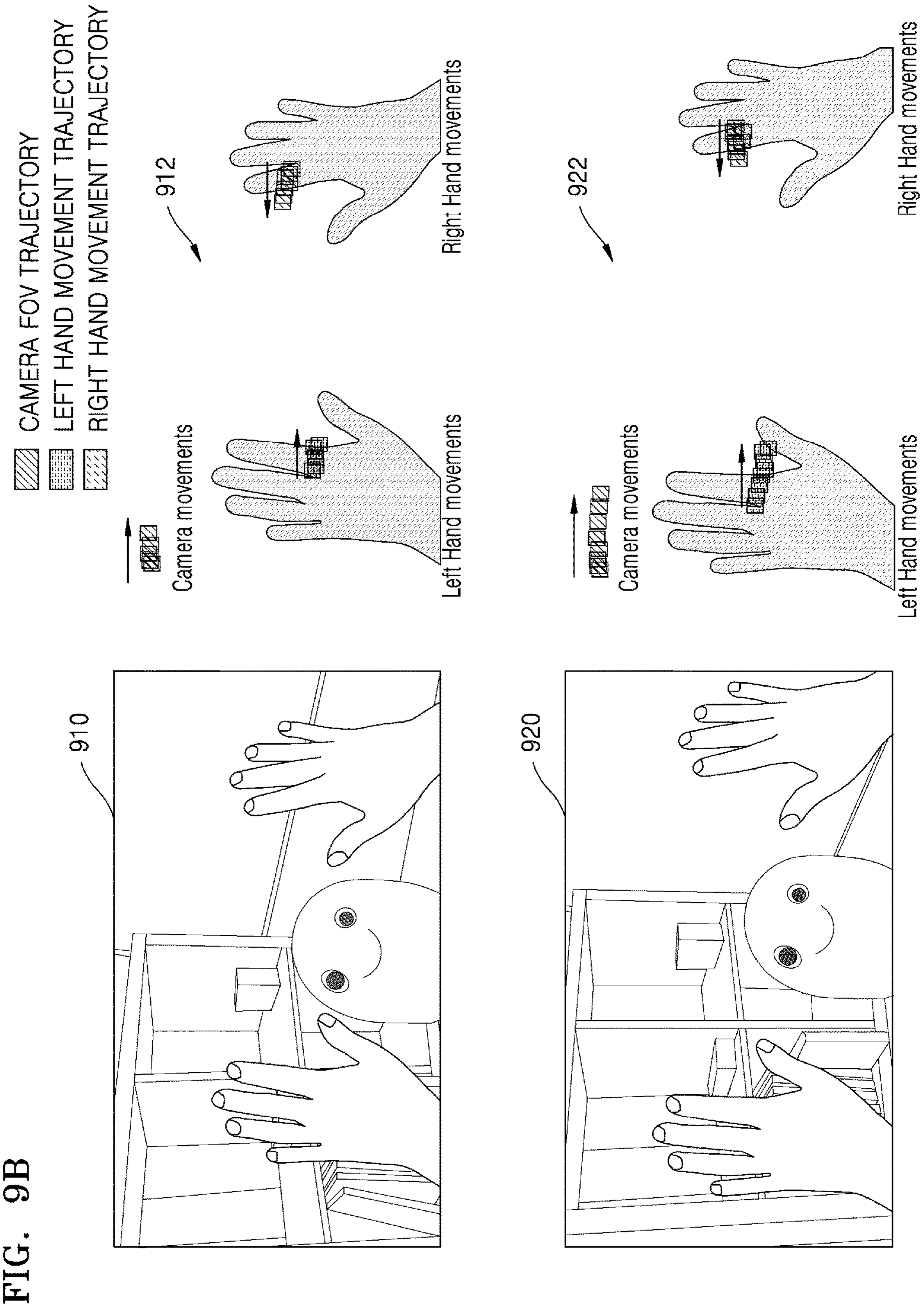
FIG. 9B is a view for describing an operation, performed by an electronic device, of comparing a FoV trajectory of a camera with hand movement trajectories of a user, according to an embodiment of the disclosure.

FIG. 9B is a view for describing an operation, performed by the electronic device, of comparing a FoV trajectory of a camera with hand movement trajectories of a user, according to an embodiment of the disclosure.

FIG. 9B shows a first frame 910 and a second frame 920 included in a video. The second frame 920 is a frame subsequent to the first frame 910, and a plurality of frames may be further included between the first and second frames 910 and 920 but are not shown for convenience of explanation.

Referring to trajectories 912 generated based on frames from previous frames of the first frame 910 to the first frame 910, a FoV trajectory of a camera, which moves from left to right, is generated, a left hand movement trajectory of a user, which moves from left to right, is generated, and a right hand movement trajectory of the user, which moves from right to left, is generated.

Referring to trajectories 922 generated based on frames from subsequent frames of the first frame 910 to the second frame 920, a FoV trajectory of the camera and a left hand movement trajectory of the user, which further move to right, are generated, and a right hand movement trajectory of the user, which further moves to left, is generated.

An operation, performed by the electronic device 2000, of using subsequent frames of the second frame 920 will now be described with reference to FIG. 9C.

Figure 9C:
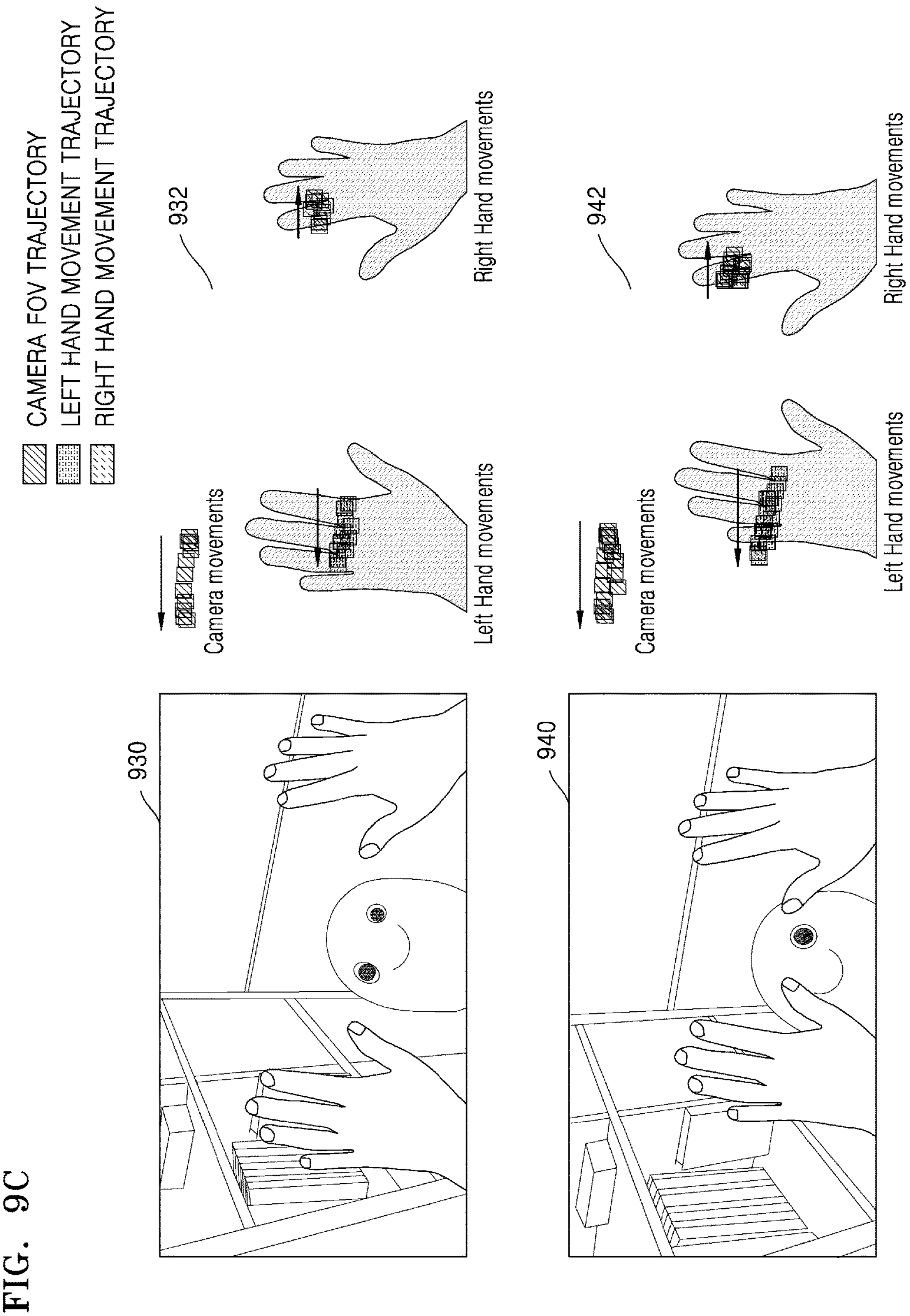
FIG. 9C is a view for describing an operation, performed by an electronic device, of comparing a FoV trajectory of a camera with hand movement trajectories of a user, according to an embodiment of the disclosure.

FIG. 9C is a view for describing an operation, performed by the electronic device, of comparing a FoV trajectory of a camera with hand movement trajectories of a user, according to an embodiment of the disclosure.

FIG. 9C shows a third frame 930 and a fourth frame 940 included in a video. The third frame 930 is a frame subsequent to the second frame 920, and a plurality of frames may be further included between the second and third frames 920 and 930. In addition, a plurality of frames may be further included between the third and fourth frames 930 and 940.

Referring to trajectories 932 generated based on frames from subsequent frames of the second frame 920 to the third frame 930, trajectories are additionally generated due to the change in moving directions of a camera and objects. For example, a FoV trajectory of the camera, which moves from right to left, is additionally generated, a left hand movement trajectory of a user, which also moves from right to left, is additionally generated, and a right hand movement trajectory of the user, which moves from left to right, is additionally generated.

Referring to trajectories 942 generated based on frames from subsequent frames of the third frame 930 to the fourth frame 940, a FoV trajectory of the camera and a left hand movement trajectory of the user, which further move to left, are generated, and a right hand movement trajectory of the user, which further moves to right, is generated.

The electronic device 2000 according to an embodiment of the disclosure may determine hand candidates of the user, based on the FoV trajectory of the camera and the object trajectories detected using the frames of the video. Specifically, the electronic device 2000 identifies object trajectories having correlation coefficients higher than or equal to a preset value with the FoV trajectory of the camera, and determines objects corresponding to the identified object trajectories, as the hand candidates of the user. In the examples of FIGS. 9B and 9C, because a left hand of the user moves similarly to the camera, a high correlation may be calculated between trajectories according to the afore-described embodiments of the disclosure, and thus the left hand may be determined as a hand candidate of the user. Although a right hand of the user moves opposite to the camera, a high correlation may be calculated between trajectories according to the afore-described embodiments of the disclosure, and thus the right hand may also be determined as a hand candidate of the user. Operations, performed by the electronic device 2000, of comparing the trajectories are described above, and thus a repeated description thereof is not provided herein.

Figure 10:
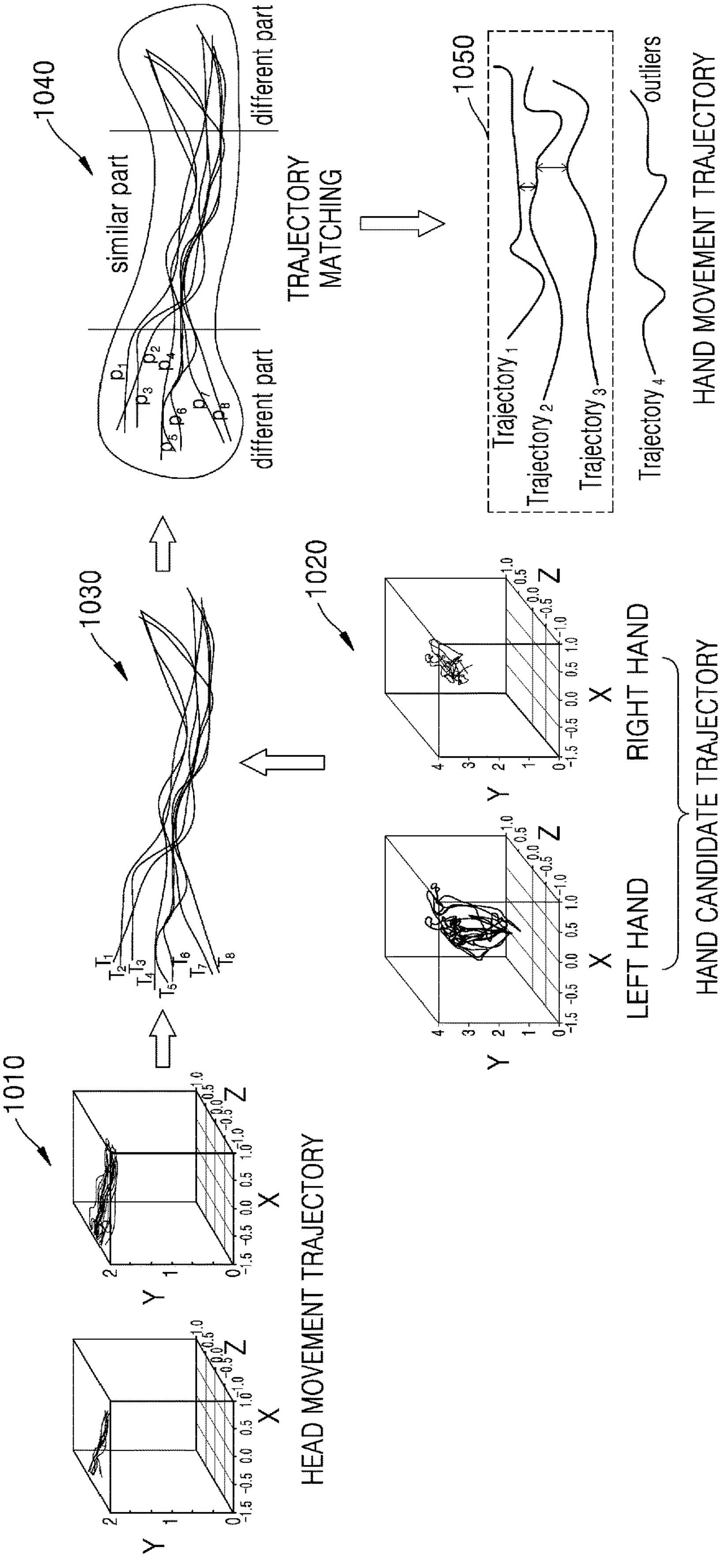
FIG. 10 is a view for describing an operation, performed by an electronic device, of determining hands of a user, according to an embodiment of the disclosure.

FIG. 10 is a view for describing an operation, performed by the electronic device, of determining hands of a user, according to an embodiment of the disclosure.

Referring to FIG. 10, the electronic device 2000 may obtain a head movement trajectory 1010. The head movement trajectory 1010 of a user may be generated based on sensor-based data and/or image-based data. A description thereof is provided above, and thus is not repeated herein.

The electronic device 2000 may obtain hand candidate trajectories 1020. The hand candidate trajectories 1020 refer to trajectories of objects determined as hand candidates of the user from among one or more objects identified in frames of a video, based on object trajectories and/or a FoV trajectory of a camera, according to the afore-described embodiments of the disclosure. That is, the hand candidate trajectories 1020 refer to object trajectories corresponding to the determined hand candidates of the user. A description thereof is provided above, and thus is not repeated herein.

The electronic device 2000 may generate a trajectory cluster 1030 by gathering the head movement trajectory 1010 and the hand candidate trajectories 1020. The electronic device 2000 may determine a hand of the user from among the hand candidates of the user through trajectory matching 1040. For example, the electronic device 2000 may calculate correlation coefficients between the head movement trajectory 1010 and the hand candidate trajectories 1020. The electronic device 2000 may use various algorithms for finding correlations. The electronic device 2000 may perform signal processing for calculating the correlation coefficients. The electronic device 2000 may use, for example, DTW for the signal processing, but is not limited thereto.

The electronic device 2000 according to an embodiment of the disclosure may identify a trajectory having a high correlation with the head movement trajectory 1010, from among the hand candidate trajectories 1020 which are object trajectories corresponding to the hand candidates of the user, and determine an object corresponding to the identified trajectory, as the hand of the user. In this case, the object trajectory corresponding to the determined hand may be called a hand movement trajectory 1050.

In an embodiment of the disclosure, the electronic device 2000 may determine whether the determined hand of the user is a left hand or a right hand. The electronic device 2000 may determine whether the hand of the user is a left hand or a right hand, based on at least one of a result of recognizing objects (hands) and/or a result of estimating feature points or poses of the objects (hands) by using an AI model, or the hand movement trajectory 1050.

The electronic device 2000 according to an embodiment of the disclosure may track the hand movement trajectory 1050 of the user, and recognize a gesture. The electronic device 2000 may execute a control command corresponding to the recognized gesture of the user.

Figure 11A:
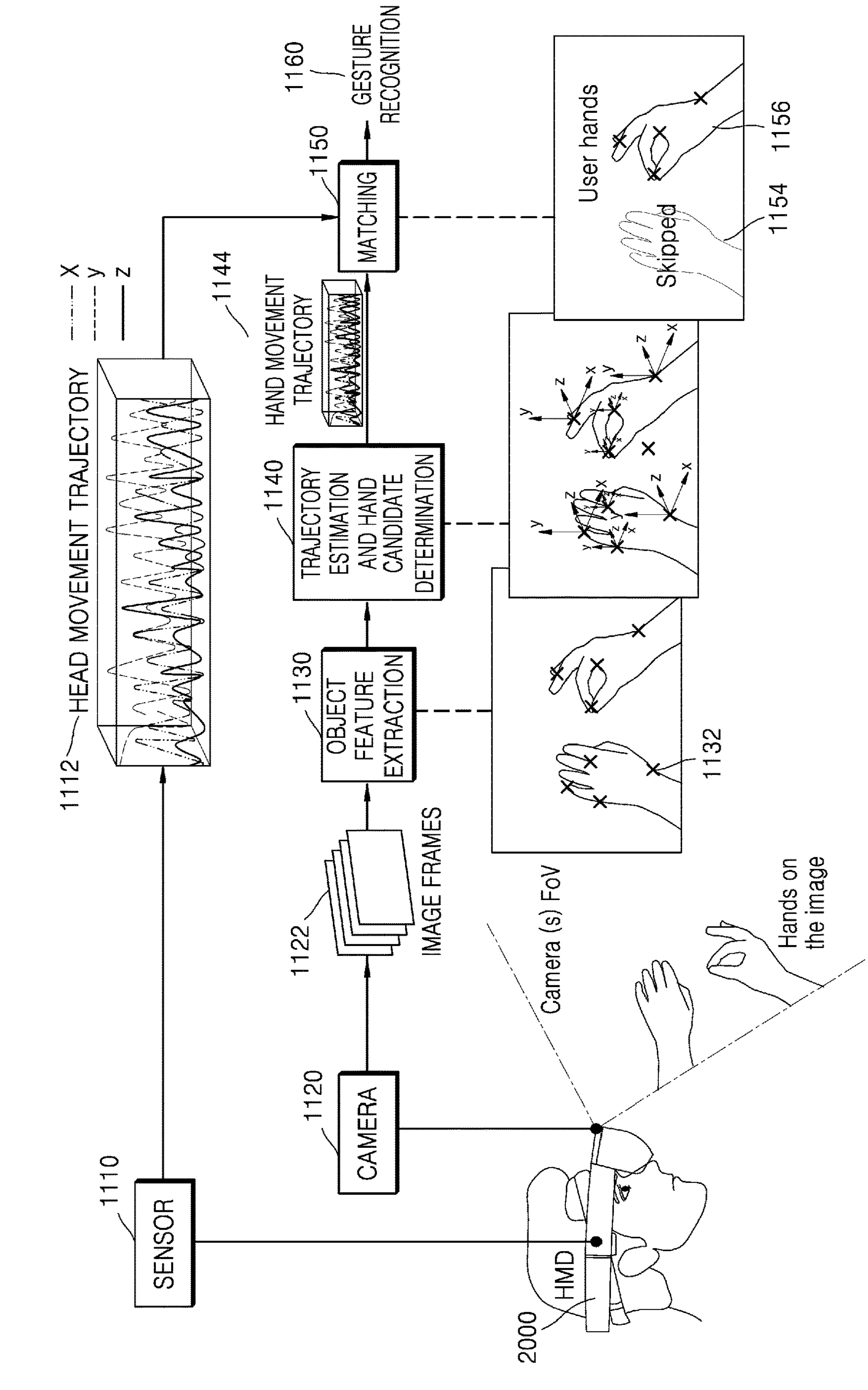
FIG. 11A is a view schematically showing an architecture for an electronic device to recognize hands of a user, according to an embodiment of the disclosure.

FIG. 11A is a view schematically showing an architecture for the electronic device to recognize hands of a user, according to an embodiment of the disclosure.

FIG. 11A is a view for describing overall connections between the afore-described embodiments of the disclosure, and thus a repeated description is not provided herein.

Figure 11B:
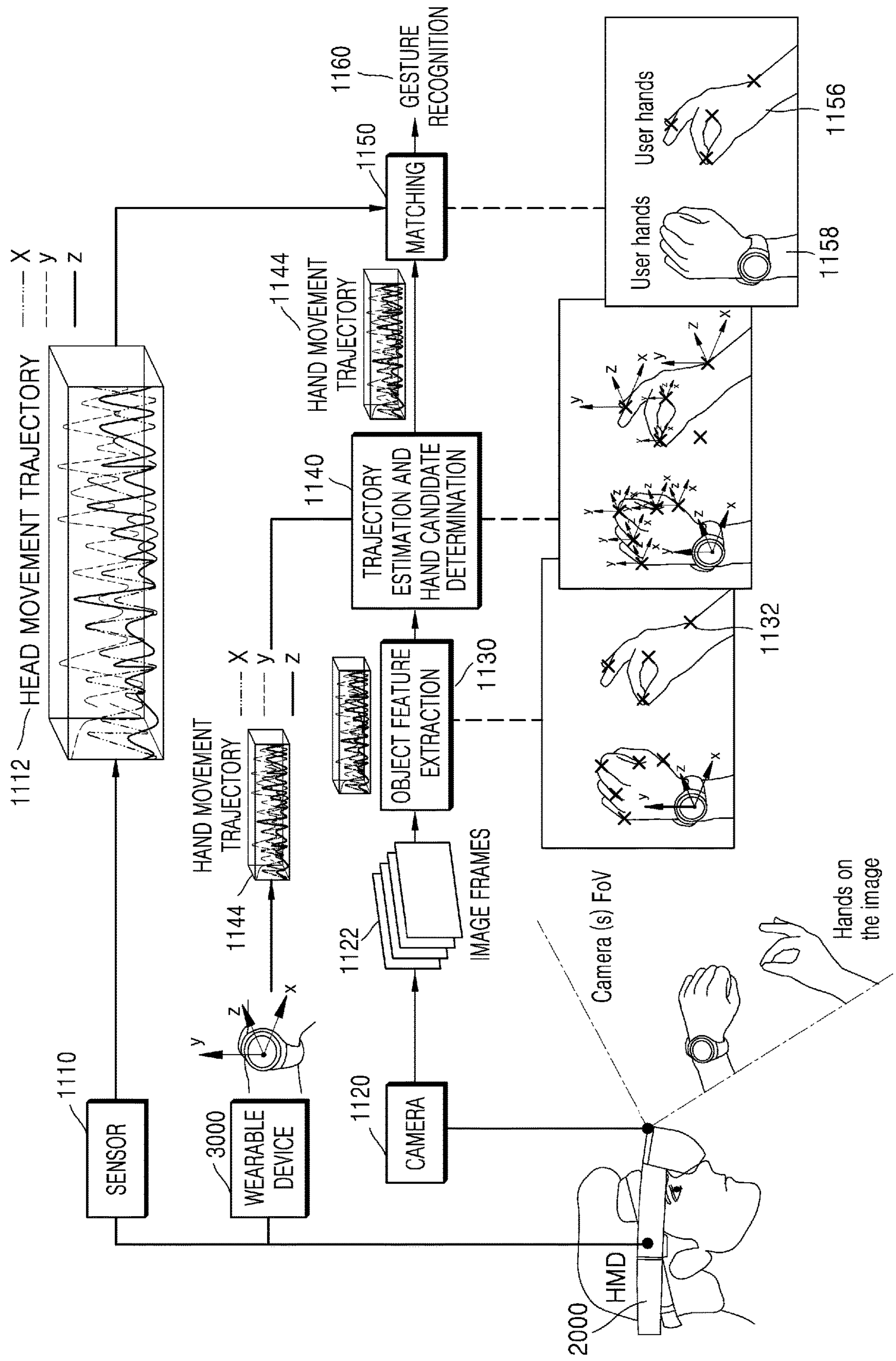
FIG. 11B is a view schematically showing another architecture for an electronic device to recognize hands of a user, according to an embodiment of the disclosure.

Referring to FIGS. 11A and 11B, in an embodiment of the disclosure, the electronic device 2000 may be a head-wearable HMD. The electronic device 2000 may include a sensor 1110 and a camera 1120, but is not limited thereto, and the sensor 1110 and the camera 1120 may be located outside the electronic device 2000 to provide data to the electronic device 2000.

In an embodiment of the disclosure, the electronic device 2000 may generate a head movement trajectory 1112 of a user, based on sensor data obtained using the sensor 1110.

In an embodiment of the disclosure, the electronic device 2000 may perform object feature extraction 1130 on one or more objects included in image frames 1122 of a video obtained using the camera 1120. For example, a first object 1154 and a second object 1156 may be included in the image frames 1122 of the video. As a result of performing the object feature extraction 1130 by the electronic device 2000, object feature point(s) 1132 may be identified in the image frames. Reference numerals for other feature points are not shown for convenience of explanation.

In an embodiment of the disclosure, after the object feature extraction 1130, the electronic device 2000 may perform trajectory estimation and hand candidate determination 1140 by using the object feature point(s) 1132. For example, the trajectory estimation may include an operation, performed by the electronic device 2000, of generating a FoV trajectory of the camera and generating object trajectories. The electronic device 2000 may estimate the FoV trajectory of the camera by using the image frames 1122 of the video, and estimate the object trajectories by using the object feature point(s) 1132. The hand candidate determination may include an operation of determining hand candidates by analyzing correlations between the FoV trajectory of the camera and the object trajectories and selecting objects which are likely to be a hand of the user from among the objects included in the image frames 1122 of the video. The electronic device 2000 may identify object trajectories corresponding to the hand candidates (hereinafter referred to as hand movement trajectories 1144).

In an embodiment of the disclosure, the electronic device 2000 may perform matching 1150 between the head movement trajectory 1112 and the hand movement trajectories 1144. The electronic device 2000 may determine a hand of the user from among the hand candidates by analyzing correlations between the head movement trajectory 1112 and the hand movement trajectories 1144. For example, as a result of determining the hand of the user by the electronic device 2000, the first object 1154 in the image frames 1122 may be determined as a hand of a person other than the user of the electronic device 2000, and the second object 1156 may be determined as a hand of the user of the electronic device 2000.

In an embodiment of the disclosure, the electronic device 2000 may perform gesture recognition 1160 by tracking the determined hand of the user. A control command corresponding to each gesture may be stored in the electronic device 2000. The electronic device 2000 according to an embodiment of the disclosure may not execute a control command in response to a gesture of a hand determined as the hand of the other person, but execute a control command only in response to a gesture of a hand determined as the hand of the user of the electronic device 2000.

FIG. 11B is a view schematically showing another architecture for the electronic device to recognize hands of a user, according to an embodiment of the disclosure.

A description provided above in relation to FIG. 11A is not repeated in relation to FIG. 11B.

In an embodiment of the disclosure, the electronic device 2000 may receive data from a second electronic device located on a hand of a user, e.g., a wearable device 3000. The wearable device 3000 may include a sensor (e.g., an IMU sensor). The electronic device 2000 may generate a hand movement trajectory 1144 of the user, based on sensor data received from the wearable device 3000. However, the hand movement trajectory 1144 of the user is not limited thereto, and may be generated by the wearable device 3000 and provided to the electronic device 2000.

In an embodiment of the disclosure, as described above in relation to FIG. 11A, the electronic device 2000 may perform the trajectory estimation and hand candidate determination 1140. Based on the hand movement trajectory 1144 generated based on the sensor data received from the wearable device 3000, the electronic device 2000 may directly determine an object corresponding to the hand movement trajectory 1144, as a hand candidate without calculating a correlation with the FoV trajectory of the camera. For example, the electronic device 2000 may determine a third object 1158 in the image frames 1122 of the video, as a hand candidate. As described above in relation to FIG. 11A, the electronic device 2000 may perform the matching 1150 between the head movement trajectory 1112 and the hand movement trajectories 1144. In this case, the electronic device 2000 may calculate a correlation coefficient by comparing the head movement trajectory 1112 with the hand movement trajectory 1144 generated based on the sensor data received from the wearable device 3000, and determine a corresponding object as a hand of the user, based on the calculation result. For example, the electronic device 2000 may determine the third object 1158 in the image frames 1122 of the video, as the hand of the user, based on whether the correlation coefficient is higher than or equal to a preset value.

Meanwhile, in an embodiment of the disclosure, the electronic device 2000 may use another method to determine whether the hand on which the wearable device 3000 is worn, is the hand of the user. For example, the electronic device 2000 may identify the wearable device 3000 in the image frames 1122 (by using an object recognition AI model or the like), and determine the hand of the user, based on identification information received from the wearable device 3000. In another example, the electronic device 2000 may directly determine an object corresponding to the hand movement trajectory 1144 generated based on the sensor data received from the wearable device 3000, as the hand of the user without determining the same as a hand candidate.

In an embodiment of the disclosure, because the second object 1156 in the image frames 1122 of the video is a hand of the user, on which the wearable device 3000 is not worn, the electronic device 2000 may determine the second object 1156 as the hand of the user, based on the operations described above in relation to FIG. 11A. Because the third object 1158 in the image frames 1122 of the video is a hand of the user, on which the wearable device 3000 is worn, the electronic device 2000 may determine the third object 1158 as the hand of the user, based on the operations described above in relation to FIG. 11B.

Meanwhile, in an embodiment of the disclosure, the electronic device 2000 may determine whether the determined hand of the user is a left hand or a right hand. For example, the electronic device 2000 may determine that the second object 1156 is the right hand and the third object 1158 is the left hand.

Figure 12:
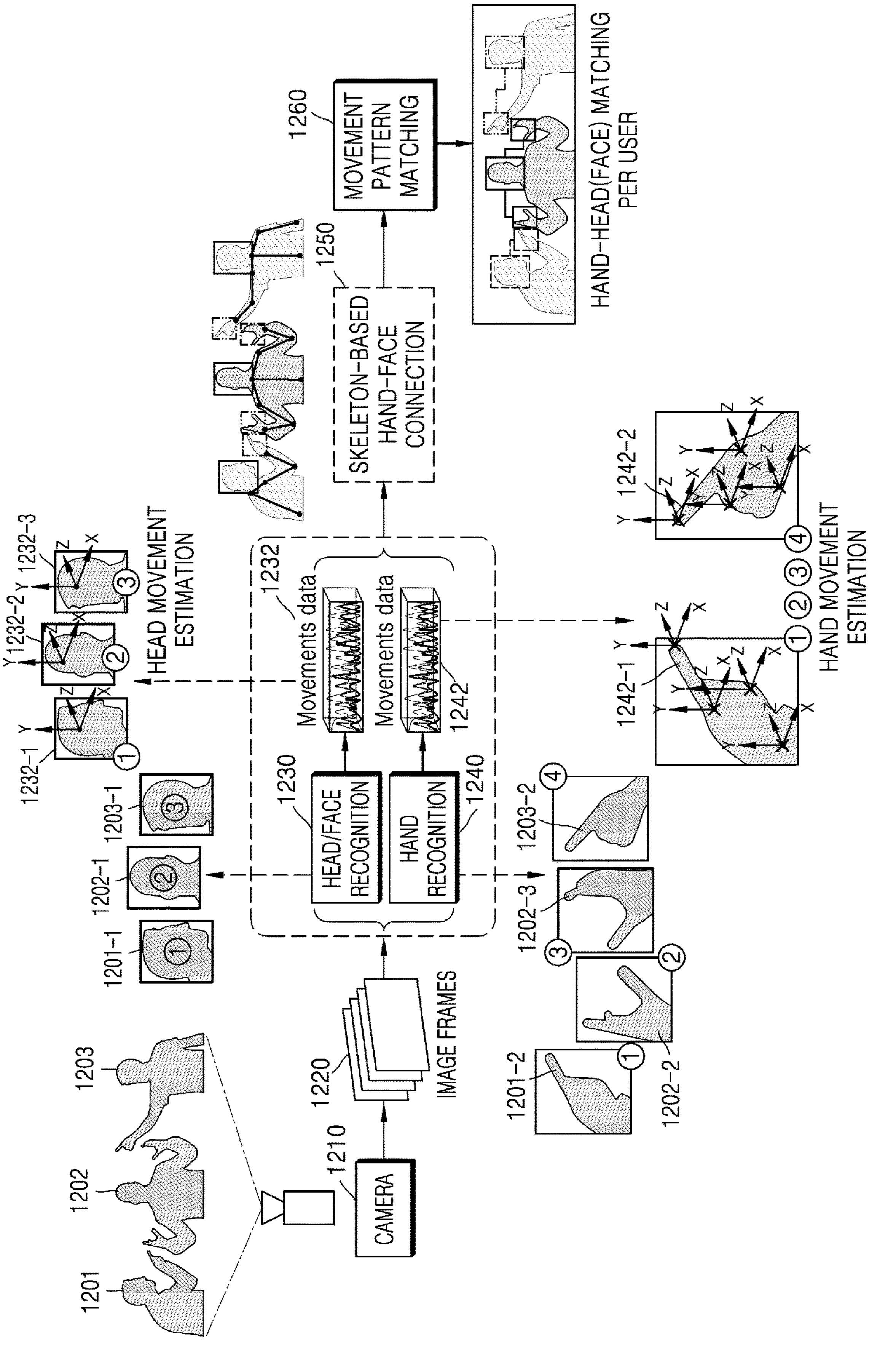
FIG. 12 is a view for describing an operation, performed by an electronic device, of distinguishing between a plurality of users and their hands, according to an embodiment of the disclosure.

FIG. 12 is a view for describing an operation, performed by the electronic device, of distinguishing between a plurality of users and their hands, according to an embodiment of the disclosure.

Referring to FIG. 12, in an embodiment of the disclosure, the electronic device 2000 may obtain a video of a plurality of users (e.g., a first user 1201, a second user 1202, and a third user 1203). The electronic device 2000 may obtain a video by using a camera 1210 included in the electronic device 2000, or receive a video captured by a camera 1210 provided outside the electronic device 2000.

In an embodiment of the disclosure, the electronic device 2000 may analyze image frames 1220 included in the video.

The electronic device 2000 may perform head/face recognition 1230. The electronic device 2000 may segment the image frames 1220 into foreground frames and background frames, and detect face feature points of the plurality of users (e.g., the first to third users 1201 to 1203) from a plurality of foreground objects in the foreground frames.

In an embodiment of the disclosure, the electronic device 2000 may detect the face feature points by using an object feature detection model. The electronic device 2000 may obtain head movement trajectories 1232 of the plurality of users (e.g., the first to third users 1201 to 1203), based on the face feature points of the plurality of users (e.g., the first to third users 1201 to 1203). Specifically, for example, the electronic device 2000 may separately identify a first user's head 1201-1, a second user's head 1202-1, and a third user's head 1203-1, and obtain a first user's head movement trajectory 1232-1, a second user's head movement trajectory 1232-2, and a third user's head movement trajectory 1232-3. Specific operations, performed by the electronic device 2000, of obtaining the head movement trajectories are already described in the afore-described embodiments of the disclosure, and thus a repeated description thereof is not provided herein. Meanwhile, as described below, it may be identified which user each head belongs to and which hand belongs to the user, through movement pattern matching 1260.

The electronic device 2000 may perform hand recognition 1240. The electronic device 2000 may segment the image frames 1220 into foreground frames and background frames, and detect hand feature points of the plurality of users (e.g., the first to third users 1201 to 1203) from a plurality of foreground objects in the foreground frames.

In an embodiment of the disclosure, the electronic device 2000 may detect the hand feature points by using an object feature detection model. The electronic device 2000 may obtain hand movement trajectories 1242 of the plurality of users (e.g., the first to third users 1201 to 1203), based on the hand feature points of the plurality of users (e.g., the first to third users 1201 to 1203). Specifically, for example, the electronic device 2000 may separately identify a first user's right hand 1201-2, a second user's right hand 1202-2, a second user's left hand 1202-3, and a third user's right hand 1203-2, and identify a first user's right hand movement trajectory 1242-1, a second user's right hand movement trajectory, a second user's left hand movement trajectory, and a third user's right hand movement trajectory 1242-2.

The second user's left hand movement trajectory and right hand movement trajectory are not shown in FIG. 12. Specific operations, performed by the electronic device 2000, of obtaining the hand movement trajectories are already described in the afore-described embodiments of the disclosure, and thus a repeated description thereof is not provided herein. Meanwhile, as described below, it may be identified which user each head belongs to and which hand belongs to the user, through the movement pattern matching 1260.

The electronic device 2000 may perform skeleton-based hand-face connection 1250. The electronic device 2000 may generate skeleton data indicating connections between feature points of major body parts, by detecting feature points of heads, hands, etc. of the plurality of users (e.g., the first to third users 1201 to 1203) in the image frames 1220 by using an object feature detection model and/or a feature extraction algorithm. The electronic device 2000 may use the skeleton data as auxiliary data to connect hands and faces of the users in the movement pattern matching 1260. In an embodiment of the disclosure, the skeleton-based hand-face connection 1250 may not be performed.

The electronic device 2000 may perform the movement pattern matching 1260. The electronic device 2000 may match the head movement trajectories to the hand movement trajectories of the users by comparing the head movement trajectories with the hand movement trajectories. Herein, when trajectories are matched, it may include a case in which a head movement trajectory and a hand movement trajectory are similar and thus a high correlation coefficient is calculated therebetween, but is not limited thereto, and also include a case in which the trajectories are not similar but identified as a head movement trajectory and a hand movement trajectory of one user.

In an embodiment of the disclosure, the electronic device 2000 may further use the above-described skeleton data to perform the movement pattern matching 1260. The electronic device 2000 may determine hand candidates of the plurality of users (e.g., the first to third users 1201 to 1203), and perform the movement pattern matching 1260 to associate the hand candidates of the plurality of users (e.g., the first to third users 1201 to 1203) with the faces of the plurality of users (e.g., the first to third users 1201 to 1203), thereby determining hands of the plurality of users.

The electronic device 2000 according to an embodiment of the disclosure may perform a control operation of the electronic device 2000, based on the matched faces and hands of the users. For example, when only the second user 1202 has control over the electronic device 2000, the electronic device 2000 may perform a control operation by recognizing only a gesture of the second user 1202 as a control command. In an embodiment of the disclosure, the electronic device 2000 may separately recognize gestures of the first to third users 1201 to 1203, and perform a control operation by recognizing a control command based on each gesture.

In an embodiment of the disclosure, the plurality of users (e.g., the first to third users 1201 to 1203) may have different levels of control. The electronic device 2000 may identify which user makes a hand gesture for controlling the electronic device 2000, identify a level of control of the identified user, and determine whether to perform a control operation, based on the identified level of control.

Figure 13:
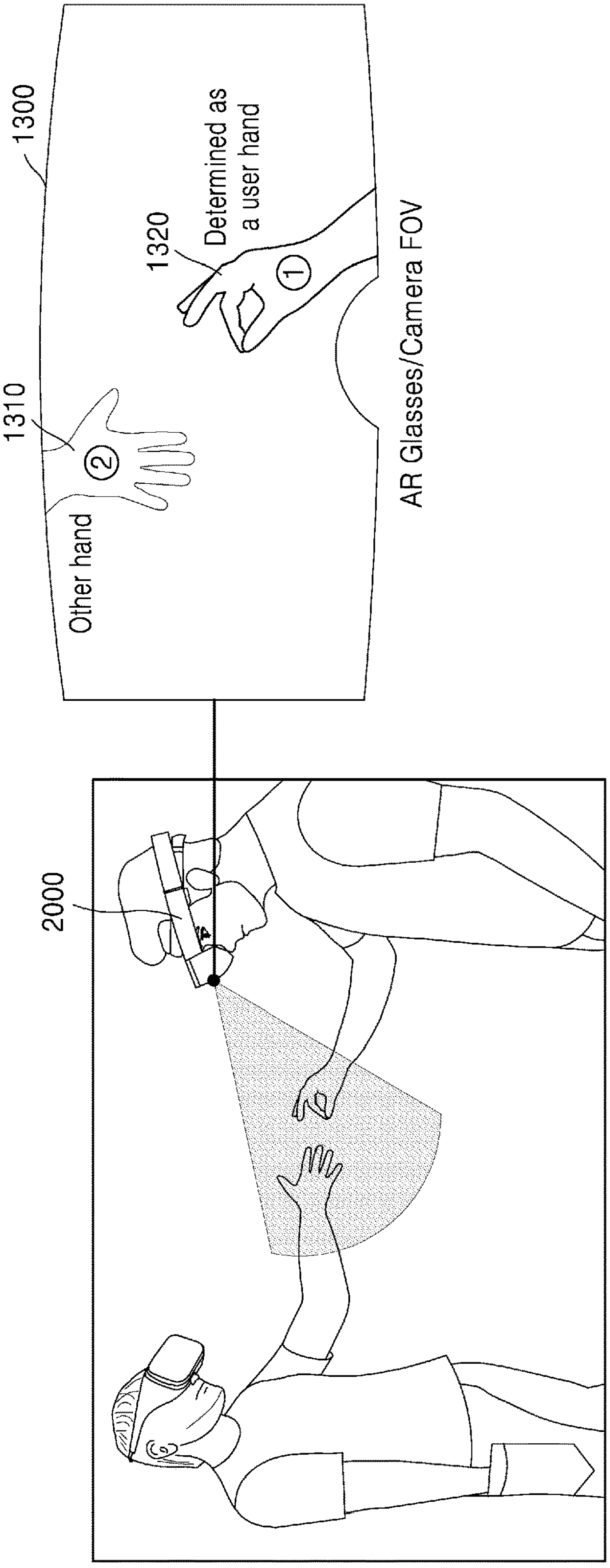
FIG. 13 is a view for describing an example in which an electronic device recognizes hands of a user, according to an embodiment of the disclosure.

FIG. 13 is a view for describing an example in which the electronic device recognizes hands of a user, according to an embodiment of the disclosure.

Referring to FIG. 13, in an embodiment of the disclosure, the electronic device 2000 may be a head-wearable HMD (e.g., AR glasses). The electronic device 2000 may determine a hand of a user, and recognize a gesture by tracking the determined hand of the user, according to the afore-described embodiments of the disclosure. The electronic device 2000 may perform a control operation, based on the recognized gesture.

For example, when the electronic device 2000 is AR glasses for providing augmented reality, the electronic device 2000 may provide augmented objects or the like in a real scene for the user. In this case, a hand 1320 of the user and a hand 1310 of another person may be included in a camera FoV 1300 of the electronic device 2000. However, when the electronic device 2000 does not determine a hand of the user, the electronic device 2000 may also be controlled by a gesture of the hand 1310 of the other person. As such, a control operation not intended by the user of the electronic device 2000 may be performed. Therefore, the electronic device 2000 needs to determine the hand 1320 of the user in the camera FoV 1300.

The electronic device 2000 may distinguish between the hand 1310 of the other person and the hand 1320 of the user in the camera FoV 1300, and recognize only the hand of the user, through the operations described above in the afore-described embodiments of the disclosure.

Figure 14:
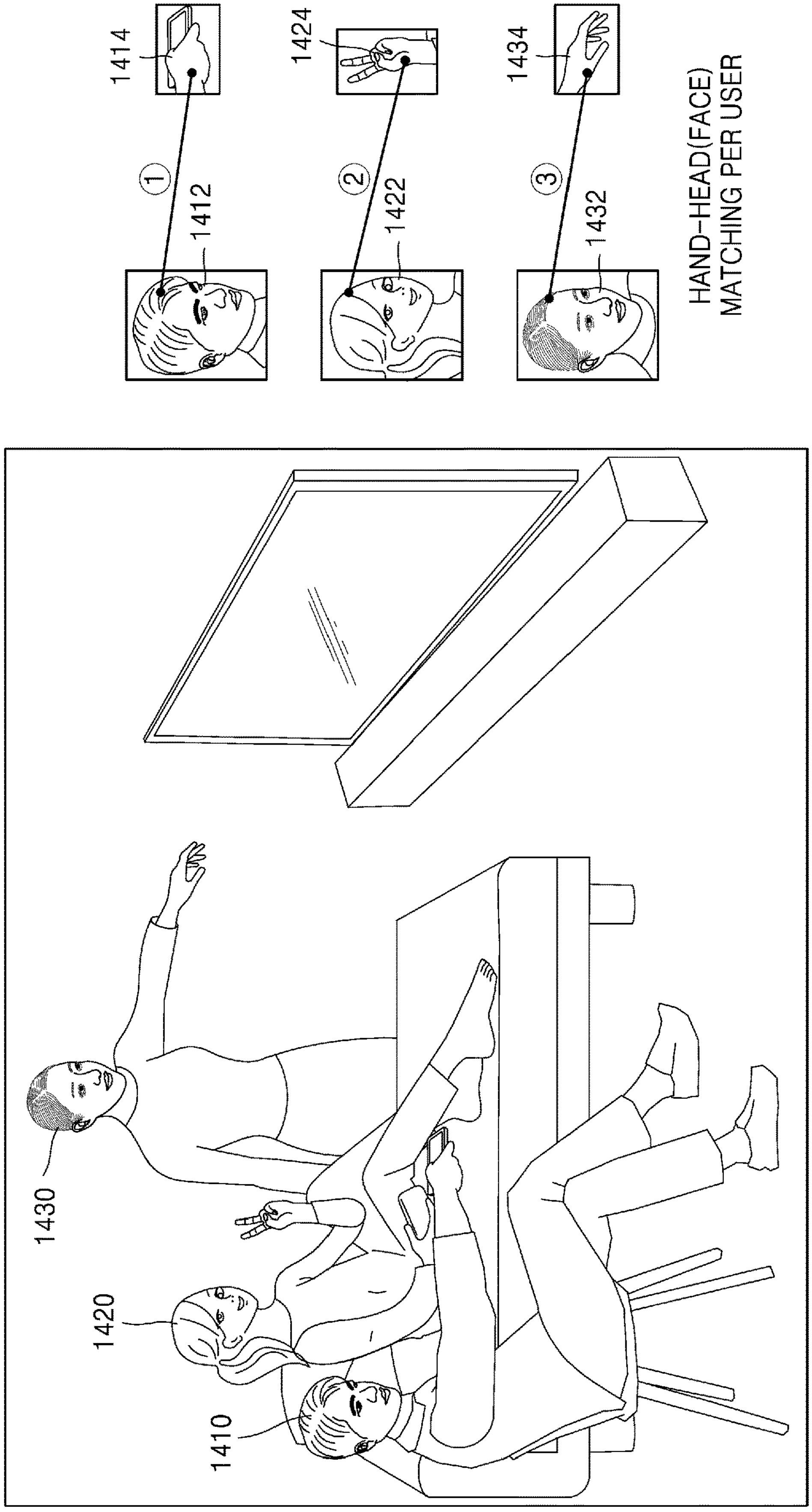
FIG. 14 is a view for describing an example in which an electronic device recognizes hands of a user, according to an embodiment of the disclosure.

FIG. 14 is a view for describing an example in which the electronic device recognizes hands of a user, according to an embodiment of the disclosure.

FIG. 14 is a view for describing an operation, performed by the electronic device 2000 located at a third location spaced apart from users, of recognizing gestures of the users and interacting with the users.

In an embodiment of the disclosure, the electronic device 2000 may be a device including a display and a camera (e.g., a television (TV)). The electronic device 2000 may determine a hand of a user, and recognize a gesture by tracking the determined hand of the user, according to the afore-described embodiments of the disclosure. The electronic device 2000 may perform a control operation, based on the recognized gesture.

Referring to FIG. 14, in an embodiment of the disclosure, when a plurality of users (e.g., a first user 1410, a second user 1420, and a third user 1430) are watching the electronic device 2000, the electronic device 2000 may separately determine hands of the plurality of users.

For example, to separately determine the hands of the plurality of users (e.g., the first to third users 1410 to 1430), the electronic device 2000 may match a first user's head 1412 and a first user's hand 1414 for the first user 1410, match a second user's head 1422 to a second user's hand 1424 for the second user 1420, and match a third user's head 1432 to a third user's hand 1434 for the third user 1430. The operation, performed by the electronic device 2000, of determining the hands of the plurality of users (e.g., the first to third users 1410 to 1430) is described above in relation to FIG. 12, and thus a repeated description thereof is not provided herein.

The electronic device 2000 according to an embodiment of the disclosure may perform a control operation of the electronic device 2000, based on the matched faces and hands of the users. For example, when only the first user 1410 has control over the electronic device 2000, the electronic device 2000 may perform a control operation by recognizing only a gesture of the first user 1410 as a control command. In an embodiment of the disclosure, the electronic device 2000 may separately recognize gestures of the first to third users 1410 to 1430, and perform a control operation by recognizing a control command based on each gesture.

In an embodiment of the disclosure, the plurality of users (e.g., the first to third users 1410 to 1430) may have different levels of control. The electronic device 2000 may identify which user makes a hand gesture for controlling the electronic device 2000, identify a level of control of the identified user, and determine whether to perform a control operation, based on the identified level of control.

Figure 15:
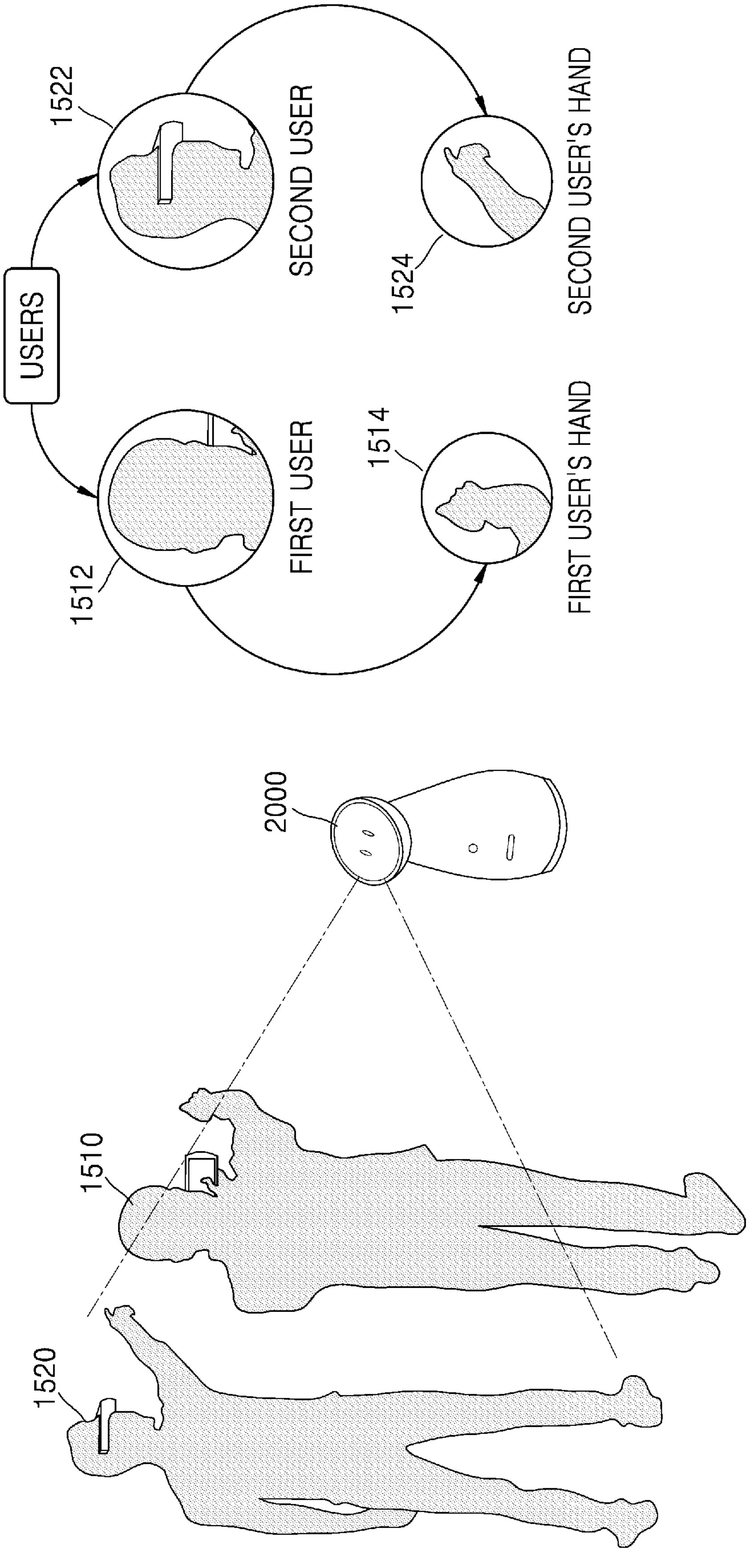
FIG. 15 is a view for describing an example in which an electronic device recognizes hands of a user, according to an embodiment of the disclosure.

FIG. 15 is a view for describing an example in which the electronic device recognizes hands of a user, according to an embodiment of the disclosure.

Like FIG. 14, FIG. 15 is a view for describing an operation, performed by the electronic device 2000 located at a third location spaced apart from users, of recognizing gestures of the users and interacting with the users.

Referring to FIG. 15, in an embodiment of the disclosure, the electronic device 2000 may be a robot. The electronic device 2000 may determine a hand of a user, and recognize a gesture by tracking the determined hand of the user, according to the afore-described embodiments of the disclosure. The electronic device 2000 may perform a control operation, based on the recognized gesture. For example, the electronic device 2000 may match a first user's head 1512 to a first user's hand 1514 for a first user 1510, and match a second user's head 1522 to a second user's hand 1524 for a second user 1520. The operation, performed by the electronic device 2000, of determining the hands of the plurality of users is described above in relation to FIG. 12, and thus a repeated description thereof is not provided herein.

The electronic device 2000 according to an embodiment of the disclosure may separately perform control operations for different users, based on gestures identified from the users.

Figure 16:
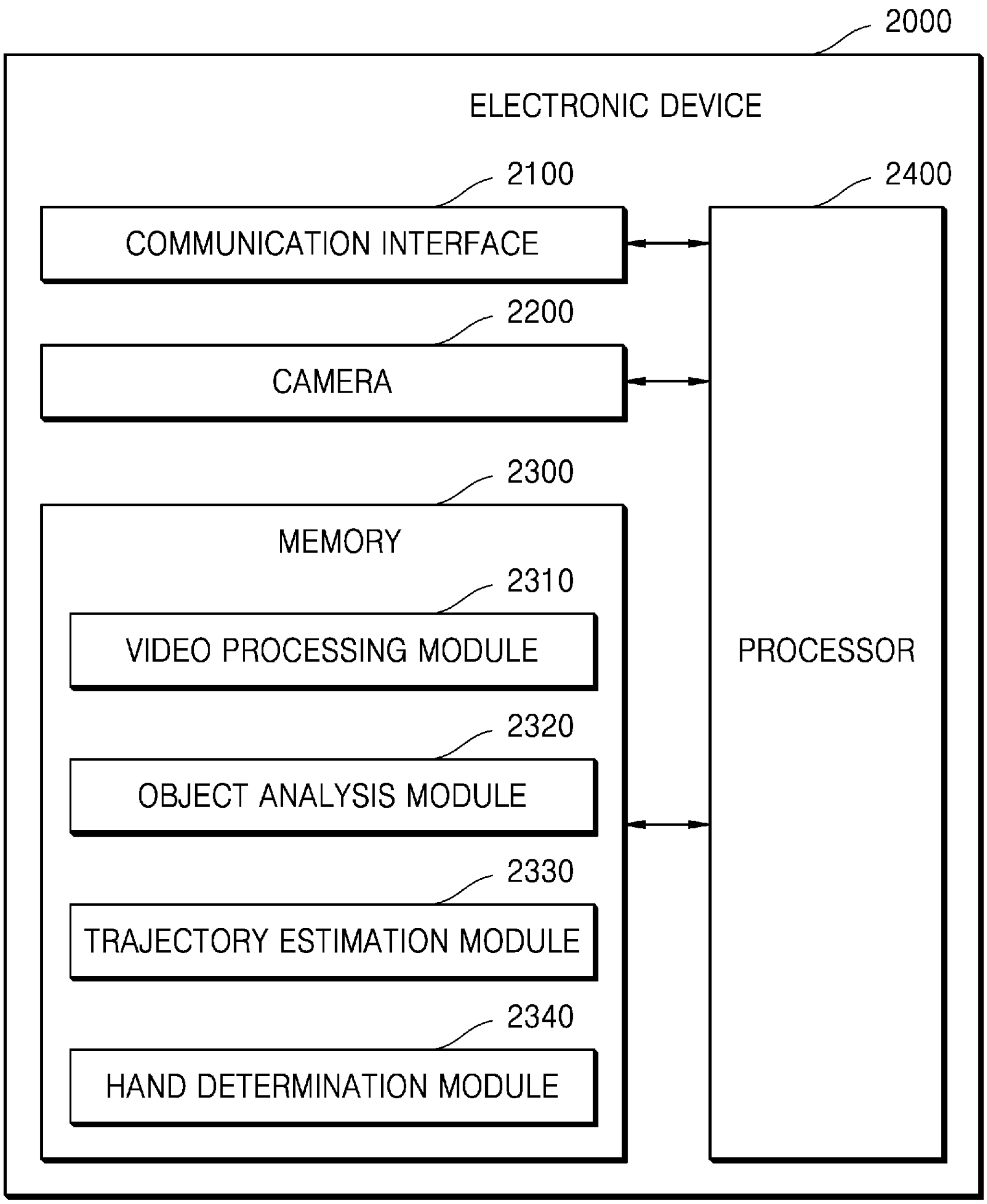
FIG. 16 is a block diagram of an electronic device according to an embodiment of the disclosure.

FIG. 16 is a block diagram of the electronic device according to an embodiment of the disclosure.

Referring to FIG. 16, the electronic device 2000 according to an embodiment of the disclosure may include a communication interface 2100, a camera 2200, a memory 2300, and a processor 2400.

The communication interface 2100 may perform data communication with other electronic devices, under the control of the processor 2400.

The communication interface 2100 may include a communication circuit. The communication interface 2100 may include a communication circuit capable of performing data communication between the electronic device 2000 and other devices by using at least one of data communication methods including, for example, wired local area network (LAN), wireless LAN, wireless fidelity (Wi-Fi), Bluetooth, ZigBee, Wi-Fi direct (WFD), Infrared Data Association (IrDA), Bluetooth low energy (BLE), near field communication (NFC), wireless broadband Internet (WiBro), world-wide interoperability for microwave access (WiMAX), shared wireless access protocol (SWAP), Wireless Gigabit Alliance (WiGig), and radio frequency (RF) communication.

The communication interface 2100 according to an embodiment of the disclosure may transmit or receive, to or from an external electronic device, data for generating a hand movement trajectory and a head movement trajectory of a user of the electronic device 2000. For example, the communication interface 2100 may obtain sensor data from a sensor located on a head of the user of the electronic device 2000. The electronic device 2000 may obtain sensor data from a sensor located on a hand of the user. The sensor located on the head and/or the hand of the user may be provided as a separate sensor supporting a communication function, or included in an electronic device other than the electronic device 2000 (e.g., a wearable device). Alternatively, the electronic device 2000 may obtain a video and/or an image from the external electronic device.

The camera 2200 may obtain a video and/or an image by photographing an object. The camera 2200 may include one or more cameras. The camera 2200 may include, for example, an RGB camera, a depth camera, or an infrared camera, but is not limited thereto. The camera 2200 may obtain a video including a plurality of frames. A specific type and detailed functions of the camera 2200 may be easily understood by one of ordinary skill in the art, and thus a description thereof is not provided herein.

The memory 2300 may store instructions, data structures, and program codes readable by the processor 2400. The memory 2300 may include one or more memories. In the disclosed embodiments of the disclosure, operations performed by the processor 2400 may be implemented by executing instructions or codes of a program stored in the memory 2300.

The memory 2300 may include memory of a flash memory type, a hard disk type, a multimedia card micro type, or a card type (e.g., secure digital (SD) or extreme digital (XD) memory), and include non-volatile memory including at least one of read-only memory (ROM), electrically erasable programmable read-only memory (EEPROM), programmable read-only memory (PROM), magnetic memory, a magnetic disk, or an optical disc, and volatile memory such as random access memory (RAM) or static random access memory (SRAM).

The memory 2300 according to an embodiment of the disclosure may store one or more instructions and/or a program for operating the electronic device 2000 to determine a hand of the user. For example, the memory 2300 may store a video processing module 2310, an object analysis module 2320, a trajectory estimation module 2330, and a hand determination module 2340.

The processor 2400 may control overall operations of the electronic device 2000. For example, the processor 2400 may control overall operations of the electronic device 2000 to determine a hand of the user in a video and/or an image, by executing one or more instructions of a program stored in the memory 2300. The processor 2400 may include one or more processors.

The processor 2400 may include at least one of, for example, a central processing unit (CPU), a microprocessor, a graphics processing unit (GPU), an application-specific integrated circuit (ASIC), a digital signal processor (DSP), a digital signal processing device (DSPD), a programmable logic device (PLD), a field-programmable gate array (FPGA), an application processor (AP), a neural processing unit (NPU), or a dedicated AI processor designed with a hardware structure specialized for processing AI models, but is not limited thereto.

The processor 2400 may process one or more frames included in the video, by executing the video processing module 2310. The processor 2400 may extract foreground objects from the frames of the video, and obtain foreground frames including the foreground objects and background frames excluding the foreground objects. In an embodiment of the disclosure, the processor 2400 may select frames to be segmented into foregrounds and backgrounds, from among the frames included in the video. For example, the processor 2400 may perform foreground and background segmentation by extracting only some frames at preset intervals from among the frames arranged in chronological order.

The processor 2400 may analyze objects included in the frames of the image, by executing the object analysis module 2320. The object analysis module may include an object detection model and/or an object feature detection model. The object detection model may be an AI model for receiving an image and outputting a result of detecting objects (e.g., hands or faces). The object detection model may be an AI model trained using a training dataset annotated with information related to objects (e.g., categories of the objects) to detect the objects. The object feature detection model may be an AI model for receiving an image and outputting a result of detecting feature points of objects (e.g., hand feature points and face feature points). The object feature detection model may be trained using a training dataset annotated with feature points of objects belonging to a plurality of categories. In an embodiment of the disclosure, to detect feature points of objects, the processor 2400 may first identify a category of the objects, and then detect feature points corresponding to the identified category. For example, the processor 2400 may identify objects 'hands' in the foreground frames, and detect feature points of the 'hands.'

The processor 2400 may estimate/generate trajectories used to determine a hand of the user, by executing the trajectory estimation module 2330.

The processor 2400 may estimate a FoV trajectory of the camera by using the background frames generated by the video processing module 2310.

The processor 2400 may compare pixels in the background frames. In this case, the background frames may be frames arranged in chronological order. The processor 2400 may obtain FoV movement information indicating movements of a FoV of the camera, by comparing pixels in the background frames. The processor 2400 may determine the FoV trajectory of the camera of the electronic device 2000, based on the FoV movement information.

The processor 2400 may obtain movement information and rotation information of the camera from the sensor located on the head of the user. The processor 2400 may determine the FoV trajectory of the camera of the electronic device 2000, based on the movement information and the rotation information.

The processor 2400 may estimate object trajectories, based on the foreground frames generated by the video processing module 2310 and the object feature points generated by the object analysis module 2320. The processor 2400 may obtain movement information of one object (or feature points of the object) in the foreground frames, based on the feature points detected from the object. The processor 2400 may determine a trajectory of the object, based on the movement information of the object. Specifically, for example, when the object in the frames is a hand or a head/face, the processor 2400 may obtain movement information of the hand or the head/face, and determine a hand movement trajectory or a head/face movement trajectory.

The processor 2400 may obtain head movement information of the user from the sensor located on the head of the user. The processor 2400 may determine the head movement trajectory, based on the head movement information of the user.

The processor 2400 may obtain hand movement information of the user from the sensor located on the hand of the user. The processor 2400 may determine the hand movement trajectory, based on the hand movement information of the user.

The processor 2400 may determine a hand of the user, by executing the hand determination module 2340.

The processor 2400 determines hand candidates of the user from among one or more objects included in the video, based on the FoV trajectory of the camera and the object trajectories. In an embodiment of the disclosure, the processor 2400 may determine the hand candidates of the user from among the one or more objects, based on whether correlation coefficients between the FoV trajectory of the camera and the object trajectories are higher than or equal to a preset value.

The processor 2400 may determine the hand of the user, based on hand movement trajectories (or object trajectories) of the hand candidates of the user and the head movement trajectory of the user. For example, based on the generated hand movement trajectories, the processor 2400 may determine the hand of the user by comparing the head movement trajectory with the hand movement trajectories. The processor 2400 may determine the hand of the user from among the hand candidates of the user, based on whether correlation coefficients between the head movement trajectory of the user and the object trajectories corresponding to the hand candidates of the user are higher than or equal to a preset value. The processor 2400 may determine whether the hand of the user is a left hand or a right hand.

Meanwhile, the above-described modules stored in the memory 2300 are for convenience of explanation and are not limited thereto. Other modules may be added to implement the afore-described embodiments of the disclosure, and some of the above-described modules may be implemented as one module. The electronic device 2000 according to an embodiment of the disclosure recognizes only the hand of the user who uses the electronic device 2000, by using the processor 2400 and the modules stored in the memory 2300. After the hand of the user is determined, the electronic device 2000 may track the hand of the user and recognize a gesture. In an embodiment of the disclosure, a preset control command for the electronic device 2000 may be stored for each type of the gesture of the hand of the user. The electronic device 2000 may execute a control command for controlling the electronic device 2000, based on the recognized gesture of the hand of the user. In this case, even when people other than the user of the electronic device 2000 make hand gestures for controlling the electronic device 2000, the electronic device 2000 does not recognize hands of the other people as hands of the user and thus may not execute control commands.

The disclosure provides a method of performing gesture recognition by accurately determining hands of a user rather than hands of other people included in an image and/or a video, to provide user interaction through gesture recognition.

The disclosure is not limited to the aforementioned description, and it will be clearly understood by one of ordinary skill in the art based on the following description.

According to an embodiment of the disclosure, a method, performed by an electronic device, of determining hands of a user in a video may be provided. The method may include obtaining a video including a plurality of frames, by using a camera. The method may include estimating a field of view (FoV) trajectory indicating movements of a FoV of the camera, by using the frames of the video. The method may include detecting feature points of one or more objects in each of the frames of the video. The method may include estimating object trajectories indicating movements of the one or more objects, based on the feature points of the one or more objects. The method may include determining hand candidates of a user from among the one or more objects, based on the FoV trajectory of the camera and the object trajectories. The method may include obtaining a head movement trajectory indicating movements of a head of the user. The method may include determining a hand of the user, based on the head movement trajectory and the object trajectories corresponding to the hand candidates of the user. The method may include tracking the determined hand of the user in the video and recognizing a gesture.

The method may further include obtaining foreground frames and background frames by extracting foreground objects from each of the frames of the video.

The estimating of the FoV trajectory of the camera may include obtaining FoV movement information related to movements of the FoV of the camera, by comparing pixels in the background frames, and determining the FoV trajectory of the camera, based on the FoV movement information. The detecting of the feature points of the one or more objects may include extracting the feature points of the one or more objects from the foreground objects in the foreground frames.

The obtaining of the head movement trajectory may include obtaining first sensor data from a first sensor located on the head of the user, and generating the head movement trajectory, based on the first sensor data.

The method may further include obtaining second sensor data from a second sensor of a second electronic device located on the hand of the user, and generating a hand movement trajectory indicating movements of the hand of the user, based on the second sensor data.

The determining of the hand of the user may include determining the hand of the user by comparing the head movement trajectory with the hand movement trajectory generated based on the second sensor data.

The determining of the hand of the user may include calculating correlation coefficients between the head movement trajectory and the object trajectories corresponding to the hand candidates of the user, and determining the hand of the user from among the hand candidates of the user, based on whether the correlation coefficients are higher than or equal to a preset value.

The detecting of the feature points of the one or more objects may include detecting face feature points and hand feature points of a plurality of users from a plurality of foreground objects in the foreground frames. The obtaining of the head movement trajectory may include obtaining head movement trajectories of the plurality of users, based on the face feature points of the plurality of users. The determining of the hand of the user may include determining hands of the plurality of users by separately associating hand candidates of the plurality of users with faces of the plurality of users.

The determining of the hand of the user may include determining whether the hand of the user is a left hand or a right hand.

The method may further include executing a control command for controlling the electronic device, based on the recognized gesture.

Meanwhile, embodiments of the disclosure may be implemented in the form of recording media including computer-executable instructions, e.g., program modules to be executed by the computer. The computer-readable media may be any available media that can be accessed by the computer, and include both volatile and non-volatile media, and removable and non-removable media. The computer-readable media may include computer storage media and communication media. The computer storage media include both volatile and non-volatile media, and removable and non-removable media implemented in any method or technology for storage of information such as computer-readable instructions, data structures, program modules, or other data. The communication media may typically include computer-readable instructions, data structures, program modules, or other data in modulated data signals.

The computer-readable storage media may be provided in the form of non-transitory storage media. When the storage medium is 'non-transitory', it denotes that the storage medium is tangible and does not include signals (e.g., electromagnetic waves), and it does not limit that data is semi-permanently or temporarily stored in the storage medium. For example, the 'non-transitory storage medium' may include a buffer storing data temporarily.

According to an embodiment of the disclosure, the method according to various embodiments of the disclosure may be included and provided in a computer program product. The computer program product may be traded as a commercial product between sellers and purchasers. The computer program product may be distributed in the form of machine-readable storage media (e.g., compact disc read-only memory (CD-ROM)), or be electronically distributed (e.g., downloaded or uploaded) via an application store or directly between two user devices (e.g., smartphones). For electronic distribution, at least a part of the computer program product (e.g., a downloadable app) may be temporarily generated or be at least temporarily stored in a machine-readable storage medium, e.g., memory of a server of a manufacturer, a server of an application store, or a relay server.

The above descriptions of the disclosure are provided for the purpose of illustration, and it will be understood by one of ordinary skill in the art that various changes in form and details may be easily made therein without departing from the scope of the disclosure. Therefore, it should be understood that the afore-described embodiments of the disclosure should be considered in a descriptive sense only and not for purposes of limitation. For example, each component described to be of a single type can be implemented in a distributed manner and, likewise, components described as being distributed can be implemented in a combined manner.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a head mounted display (HMD) device, of determining hands of a user in a video, the method comprising:

obtaining a video comprising a plurality of frames, by using a camera of the HMD device;

estimating a field of view (FoV) trajectory indicating movements of a FoV of the camera, by using the plurality of frames of the video;

detecting feature points of one or more objects in the plurality of frames of the video;

estimating object trajectories indicating movements of the one or more objects, based on the feature points of the one or more objects, the object trajectories being estimated based on movement information of a center point of the feature points;

determining hand candidates of a user from among the one or more objects, based on the FoV trajectory of the camera and the object trajectories;

obtaining a head movement trajectory indicating movements of a head of the user using one or more sensors included in the HMD device, the one or more sensors being different from a camera;

determining a hand of the user, based on the head movement trajectory and the object trajectories corresponding to the hand candidates of the user;

tracking the determined hand of the user in the video and recognizing a gesture; and executing a control command for controlling the HMD device, based on the recognized gesture.

2. The method of claim 1, further comprising obtaining foreground frames and background frames by extracting foreground objects from each of the frames of the video.

3. The method of claim 2, wherein the estimating of the FoV trajectory of the camera comprises:

obtaining FoV movement information related to movements of the FoV of the camera, by comparing pixels in the background frames, and determining the FoV trajectory of the camera, based on the FoV movement information, and wherein the detecting of the feature points of the one or more objects comprises extracting the feature points of the one or more objects from the foreground objects in the foreground frames.

4. The method of claim 3, wherein the detecting of the feature points of the one or more objects comprises detecting face feature points and hand feature points of a plurality of users from a plurality of foreground objects in the foreground frames, wherein the obtaining of the head movement trajectory comprises obtaining head movement trajectories of the plurality of users, based on the face feature points of the plurality of users, and wherein the determining of the hand of the user comprises determining hands of the plurality of users by separately associating hand candidates of the plurality of users with faces of the plurality of users.

5. The method of claim 1, wherein the obtaining of the head movement trajectory comprises:

obtaining first sensor data from a first sensor located on the head of the user; and generating the head movement trajectory, based on the first sensor data.

6. The method of claim 1, further comprising:

obtaining second sensor data from a second sensor of a second electronic device located on the hand of the user; and generating a hand movement trajectory indicating movements of the hand of the user, based on the second sensor data.

7. The method of claim 6, wherein the determining of the hand of the user comprises determining the hand of the user by comparing the head movement trajectory with the hand movement trajectory generated based on the second sensor data.

8. The method of claim 1, wherein the determining of the hand of the user comprises:

calculating correlation coefficients between the head movement trajectory and the object trajectories corresponding to the hand candidates of the user; and determining the hand of the user from among the hand candidates of the user, based on whether the correlation coefficients are higher than or equal to a preset value.

9. The method of claim 1, wherein the determining of the hand of the user comprises determining whether the hand of the user is a left hand or a right hand.

10. The method of claim 1, further comprising:

selecting frames, from among the plurality of frames of the video, to be segmented into foregrounds and backgrounds by extracting only some frames at preset intervals.

11. A head mounted display (HMD) device for determining hands of a user in a video, the HMD device comprising:

at least one camera;

a memory configured to store one or more instructions; and at least one processor configured to execute the one or more instructions stored in the memory to:

obtain a video comprising a plurality of frames, by using the at least one camera, estimate a field of view (FoV) trajectory indicating movements of a FoV of the at least one camera, by using the plurality of frames of the video, detect feature points of one or more objects in the plurality of frames of the video, estimate object trajectories indicating movements of the one or more objects, based on the feature points of the one or more objects, the object trajectories being estimated based on movement information of a center point of the feature points, determine hand candidates of a user from among the one or more objects, based on the FoV trajectory of the camera and the object trajectories, obtain a head movement trajectory indicating movements of a head of the user using one or more sensors included in the HMD device, the one or more sensors being different from a camera, determine a hand of the user, based on the head movement trajectory and the object trajectories corresponding to the hand candidates of the user, track the determined hand of the user in the video and recognize a gesture, and execute a control command for controlling the HMD device, based on the recognized gesture.

12. The HMD device of claim 11, wherein the at least one processor is further configured to execute the one or more instructions to obtain foreground frames and background frames by extracting foreground objects from each of the frames of the video.

13. The HMD device of claim 12, wherein the at least one processor is further configured to execute the one or more instructions to:

obtain FoV movement information related to movements of the FoV of the at least one camera, by comparing pixels in the background frames;

determine the FoV trajectory of the camera, based on the FoV movement information; and extract the feature points of the one or more objects from the foreground objects in the foreground frames.

14. The HMD device of claim 13, wherein the at least one processor is further configured to execute the one or more instructions to:

detect face feature points and hand feature points of a plurality of users from a plurality of foreground objects in the foreground frames;

obtain head movement trajectories of the plurality of users, based on the face feature points of the plurality of users; and determine hands of the plurality of users by separately associating hand candidates of the plurality of users with faces of the plurality of users.

15. The HMD device of claim 11, wherein the at least one processor is further configured to execute the one or more instructions to:

obtain first sensor data from a first sensor located on the head of the user; and generate the head movement trajectory, based on the first sensor data.

16. The HMD device of claim 11, wherein the at least one processor is further configured to execute the one or more instructions to:

obtain second sensor data from a second sensor of a second electronic device located on the hand of the user; and generate a hand movement trajectory indicating movements of the hand of the user, based on the second sensor data.

17. The HMD device of claim 16, wherein the at least one processor is further configured to execute the one or more instructions to determine the hand of the user by comparing the head movement trajectory with the hand movement trajectory generated based on the second sensor data.

18. The HMD device of claim 11, wherein the at least one processor is further configured to execute the one or more instructions to:

calculate correlation coefficients between the head movement trajectory and the object trajectories corresponding to the hand candidates of the user; and determine the hand of the user from among the hand candidates of the user, based on whether the correlation coefficients are higher than or equal to a preset value.

19. The HMD device of claim 11, wherein the at least one processor is further configured to execute the one or more instructions to determine whether the hand of the user is a left hand or a right hand.

20. A non-transitory computer-readable recording medium having recorded thereon a computer program, which, when executed by a head mounted display (HMD) device, performs a method comprising:

obtaining a video comprising a plurality of frames, by using a camera of the HMD device;

estimating a field of view (FoV) trajectory indicating movements of a FoV of the camera, by using the plurality of frames of the video;

detecting feature points of one or more objects in the plurality of frames of the video;

estimating object trajectories indicating movements of the one or more objects, based on the feature points of the one or more objects, the object trajectories being estimated based on movement information of a center point of the feature points;

determining hand candidates of a user from among the one or more objects, based on the FoV trajectory of the camera and the object trajectories;

obtaining a head movement trajectory indicating movements of a head of the user using one or more sensors included in the HMD device, the one or more sensors being different from a camera;

determining a hand of the user, based on the head movement trajectory and the object trajectories corresponding to the hand candidates of the user;

tracking the determined hand of the user in the video and recognizing a gesture; and executing a control command for controlling the HMD device, based on the recognized gesture.

* * * * *